United States Patent
Bruce et al.

(10) Patent No.: US 9,668,544 B2
(45) Date of Patent: Jun. 6, 2017

(54) LAST SYSTEM FOR ARTICLES WITH BRAIDED COMPONENTS

(71) Applicant: NIKE, Inc., Beaverton, OR (US)

(72) Inventors: Robert M. Bruce, Portland, OR (US); Eun Kyung Lee, Beaverton, OR (US); Craig K. Sills, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 79 days.

(21) Appl. No.: 14/565,568

(22) Filed: Dec. 10, 2014

(65) Prior Publication Data
US 2016/0166010 A1 Jun. 16, 2016

(51) Int. Cl.

| | | |
|---|---|---|
| A43B 1/04 | (2006.01) |
| A43D 3/02 | (2006.01) |
| A43B 23/02 | (2006.01) |
| B29C 67/00 | (2017.01) |
| B33Y 80/00 | (2015.01) |
| D04C 3/48 | (2006.01) |
| D04C 1/06 | (2006.01) |
| B33Y 10/00 | (2015.01) |

(52) U.S. Cl.
CPC .................. *A43D 3/02* (2013.01); *A43B 1/04* (2013.01); *A43B 23/0225* (2013.01); *A43B 23/0235* (2013.01); *A43D 3/022* (2013.01); *B29C 67/0051* (2013.01); *B33Y 80/00* (2014.12); *D04C 1/06* (2013.01); *D04C 3/48* (2013.01); *B33Y 10/00* (2014.12); *D10B 2501/043* (2013.01)

(58) Field of Classification Search
CPC ............... A43B 1/04; A43D 3/00; A43D 3/02
USPC ....................... 12/133 R, 133 B, 133 M, 145
See application file for complete search history.

(56) References Cited

U.S. PATENT DOCUMENTS

| | | | |
|---|---|---|---|
| 376,372 A | 1/1888 | Dodge et al. | |
| 2,271,888 A * | 2/1942 | Manley | B05B 15/0456 12/133 R |
| 2,521,072 A * | 9/1950 | Lovell | A43D 3/02 12/133 M |
| 2,617,129 A * | 11/1952 | Petze | A43D 3/028 12/128 F |
| 2,641,004 A * | 6/1953 | Ronyan | A43B 1/02 12/133 R |

(Continued)

FOREIGN PATENT DOCUMENTS

| | | |
|---|---|---|
| DE | 102011009641 A1 | 8/2012 |
| GB | 477556 A | 1/1938 |

(Continued)

OTHER PUBLICATIONS

Pending U.S. Appl. No. 14/273,726, filed May 9, 2014.
International Search Report and Written Opinion dated Apr. 4, 2016 for PCT Patent Application No. PCT/US2015055902, 17 Pages.

*Primary Examiner* — Marie Bays
(74) *Attorney, Agent, or Firm* — Shook, Hardy & Bacon L.L.P.

(57) ABSTRACT

A last system and a method of making the last system are disclosed. The last system includes a last member and an exterior layer. The exterior layer becomes deformable when heated above a characteristic temperature. The method can include forming a braided footwear component on the last system. The exterior layer may be joined with the braided footwear component by heating the last system above the characteristic temperature.

13 Claims, 20 Drawing Sheets

(56) References Cited

U.S. PATENT DOCUMENTS

| | | |
|---|---|---|
| 2,701,887 A | 2/1955 | Nolan |
| 3,282,757 A | 11/1966 | Brussee |
| 3,397,847 A | 8/1968 | Thaden |
| 3,525,110 A * | 8/1970 | Rubico ............ A43D 3/02 12/145 |
| 3,586,058 A | 6/1971 | Ahrens et al. |
| 3,745,600 A | 7/1973 | Rubico et al. |
| 4,519,290 A | 5/1985 | Inman et al. |
| 4,591,155 A | 5/1986 | Adachi |
| 4,629,650 A | 12/1986 | Kataoka |
| 4,719,837 A | 1/1988 | McConnell et al. |
| 4,847,063 A | 7/1989 | Smith |
| 4,848,745 A | 7/1989 | Bohannan et al. |
| 4,857,124 A | 8/1989 | Shobert et al. |
| 4,885,973 A | 12/1989 | Spain |
| 4,916,997 A | 4/1990 | Spain |
| 4,919,388 A | 4/1990 | Koike et al. |
| 4,976,812 A | 12/1990 | McConnell et al. |
| 4,992,313 A | 2/1991 | Shobert et al. |
| 5,001,961 A | 3/1991 | Spain |
| 5,067,525 A | 11/1991 | Tsuzuki et al. |
| 5,121,329 A | 6/1992 | Crump |
| 5,203,249 A | 4/1993 | Adams et al. |
| 5,348,056 A | 9/1994 | Tsuzuki |
| 5,361,674 A | 11/1994 | Akiyama et al. |
| 5,388,497 A | 2/1995 | Akiyama et al. |
| 5,398,586 A | 3/1995 | Akiyama et al. |
| 5,439,215 A | 8/1995 | Ratchford |
| 5,476,027 A | 12/1995 | Uchida et al. |
| 5,885,622 A | 3/1999 | Daley |
| 6,024,005 A | 2/2000 | Uozumi |
| 6,510,961 B1 | 1/2003 | Head et al. |
| 6,696,001 B1 | 2/2004 | Quddus |
| 7,093,527 B2 | 8/2006 | Rapaport et al. |
| 7,204,903 B2 | 4/2007 | Yasui |
| 7,262,353 B2 | 8/2007 | Bartholomew et al. |
| 7,300,014 B2 | 11/2007 | Allen |
| 7,444,916 B2 | 11/2008 | Hirukawa |
| 7,549,185 B2 | 6/2009 | Yang |
| 7,566,376 B2 | 7/2009 | Matsuoka |
| 7,793,576 B2 | 9/2010 | Head et al. |
| 7,815,141 B2 | 10/2010 | Uozumi et al. |
| 7,941,942 B2 | 5/2011 | Hooper et al. |
| 8,006,601 B2 | 8/2011 | Inazawa et al. |
| 8,061,253 B2 | 11/2011 | Wybrow |
| 8,210,086 B2 | 7/2012 | Head et al. |
| 8,394,222 B2 | 3/2013 | Rettig |
| 8,544,191 B2 | 10/2013 | Marvin et al. |
| 8,578,534 B2 | 11/2013 | Langvin et al. |
| 8,690,962 B2 | 4/2014 | Dignam et al. |
| 8,757,038 B2 | 6/2014 | Siegismund |
| 2013/0305465 A1 | 11/2013 | Siegismund |
| 2014/0000043 A1 | 1/2014 | Boardman et al. |
| 2014/0377488 A1 | 12/2014 | Jamison |
| 2015/0007451 A1 | 1/2015 | Bruce |

FOREIGN PATENT DOCUMENTS

| | | |
|---|---|---|
| JP | 07-054250 A | 2/1995 |
| JP | 07-216703 A | 8/1995 |
| WO | 2014209596 A1 | 12/2014 |

* cited by examiner

LAST SYSTEM FOR ARTICLES WITH BRAIDED COMPONENTS

BACKGROUND

The present embodiments relate generally to articles of footwear, and in particular to a last system for making articles of footwear.

Articles of footwear generally include two primary elements: an upper and a sole structure. The upper may be formed from a variety of materials that are stitched or adhesively bonded together to form a void within the footwear for comfortably and securely receiving a foot. The sole structure is secured to a lower portion of the upper and is generally positioned between the foot and the ground. In many articles of footwear, including athletic footwear styles, the sole structure often incorporates an insole, a midsole, and an outsole.

An upper may be manufactured using a last. The last may be a foot-shaped form around which the upper may be assembled so that the upper has the approximate shape of a foot.

SUMMARY

In one aspect, a method of making an upper for an article of footwear includes providing a last member, where the last member has an outer surface. The method also includes forming an exterior layer of a heat deformable material onto the outer surface of the last member. The method also includes forming a braided footwear component onto the exterior layer. The method also includes heating the exterior layer so that the exterior layer is joined with the braided footwear component to form a composite structure. The method also includes removing the last member from the composite structure.

In another aspect, a method of making an upper for an article of footwear includes providing a last member, where the last member has an outer surface. The method also includes forming a first region of an exterior layer onto the outer surface of the last member, where the first region has a first thickness and where the exterior layer is comprised of a heat deformable material. The method also includes forming a second region of the exterior layer onto the outer surface of the last member, where the second region has a second thickness that is different from the first thickness. The method further includes forming a braided footwear component onto the exterior layer and heating the exterior layer so that the exterior layer is joined with the braided footwear component to form a composite structure. The method also includes removing the last member from the composite structure.

In another aspect, a last system for making an article of footwear includes a last member with an outer surface, where the last member has a foot-like geometry. The last system also includes an exterior layer disposed on the outer surface. The last member is made of a first material and the exterior layer is made of a second material that is different than the first material. The second material of the exterior layer has a characteristic temperature, where the second material is configured to be moldable when heated to a temperature above the characteristic temperature. The exterior layer has a first region and a second region, where the first region has a first thickness, and where the second region has a second thickness that is different than the first thickness.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
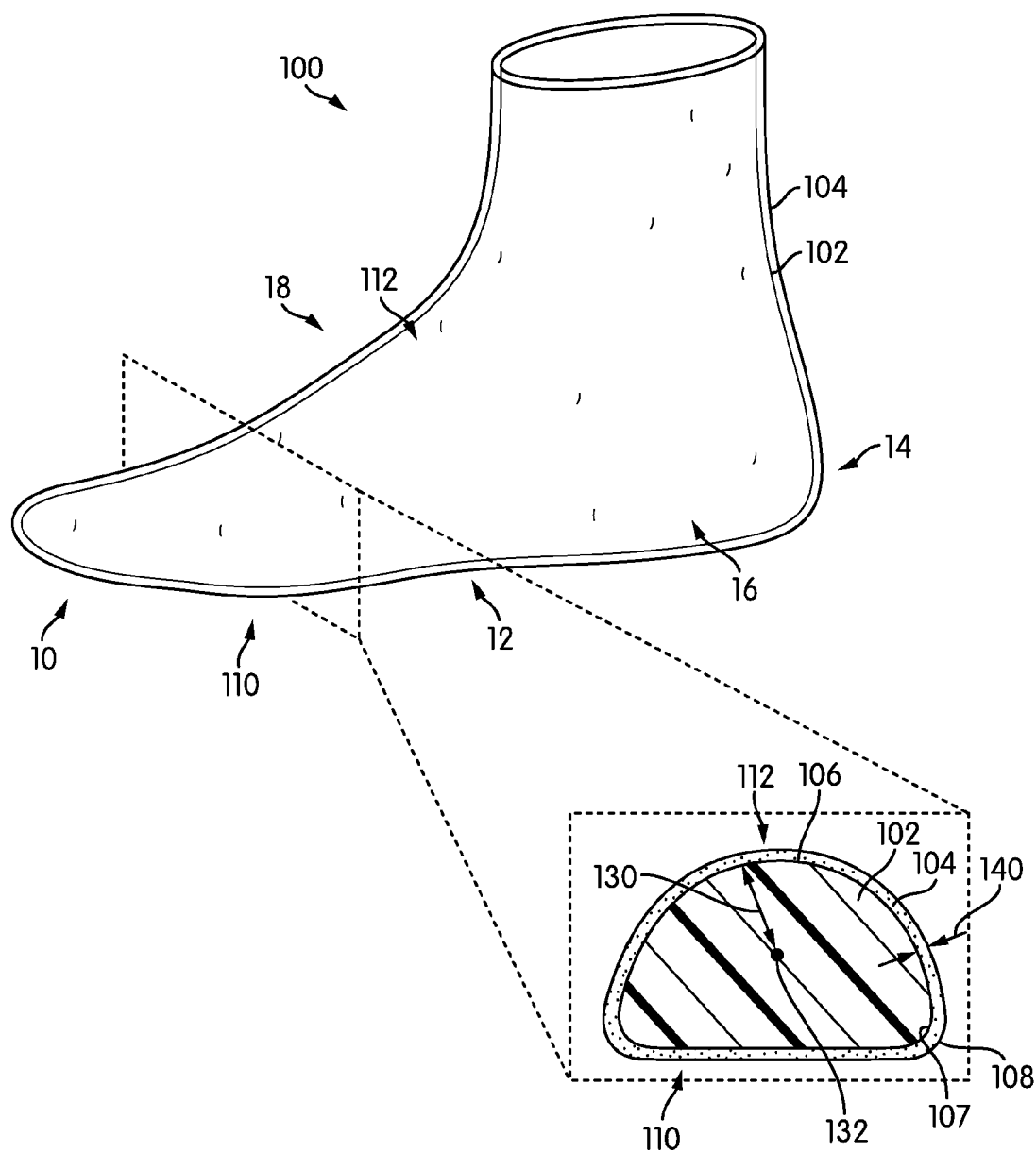
FIG. 1 is a schematic view of an embodiment of a last system including a last member and an exterior layer.

FIG. 1 illustrates an isometric view of an embodiment of a last system 100. Last system 100 may have the approximate geometry of a foot, and may generally be configured to receive materials for forming the upper of an article of footwear. In the exemplary embodiment, last system 100 is shown with a general foot shape, however in other embodiments last system 100 could be configured with any desired foot geometry.

Last system 100 can be used to manufacture components (e.g., an upper) of various kinds of footwear. The types of footwear may include, but are not limited to: hiking boots, soccer shoes, football shoes, sneakers, running shoes, cross-training shoes, rugby shoes, basketball shoes, baseball shoes as well as other kinds of shoes. Moreover, in some embodiments, last system 100 may be used to manufacture various other kinds of non-sports related footwear, including, but not limited to: slippers, sandals, high heeled footwear, and loafers.

Although the embodiment depicts a last system configured for making articles of footwear, other embodiments could use a last system for manufacturing other kinds of articles. Such articles may include, but are not limited to: articles of clothing, hats, gloves, socks, bags, pads, sporting equipment as well as any other kinds of articles that may be manufactured using a last of some kind. In other embodiments, the geometry of a last system could be varied to accommodate any other kind of article.

Last system 100 may further include a last member 102 and an exterior layer 104. In particular, as seen in FIG. 1, exterior layer 104 may be disposed on outer surface 106 of last member 102. As seen in the enlarged cross-sectional view of FIG. 1, last member 102 may comprise a core portion, or interior portion, of last system 100. Specifically, in at least some embodiments, last member 102 may be completely covered by exterior layer 104. Alternatively, in some other embodiments, only some portions of last member 102 may be covered with exterior layer 104, while other portions of last member 102 may be exposed on an outermost surface of last system 100.

For purposes of illustration, exterior layer 104 is depicted as substantially transparent in the exemplary embodiments, so that last member 102 is at least partially visible through exterior layer 104. In some embodiments, exterior layer 104 may be made of a material that is at least partially transparent. However, in other embodiments (not shown), exterior layer 104 may be substantially opaque such that last member 102 is not even partially visible through exterior layer 104.

Referring to FIG. 1, for purposes of reference, last system 100 may be divided into forefoot portion 10, midfoot portion 12 and heel portion 14. These portions may be generally associated with corresponding portions of a foot, since last system 100 shares an approximately similar geometry with a foot. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. In addition, last system 100 may include lateral side 16 and medial side 18. In particular, lateral side 16 and medial side 18 may be opposing sides of last system 100. Furthermore, both lateral side 16 and medial side 18 may extend through forefoot portion 10, midfoot portion 12 and heel portion 14.

It will be understood that forefoot portion 10, midfoot portion 12 and heel portion 14 are only intended for purposes of description and are not intended to demarcate precise regions of last system 100. Likewise, lateral side 16 and medial side 18 are intended to represent generally two sides of last system 100, rather than precisely demarcating last system 100 into two halves. Moreover, throughout the embodiments, forefoot portion 10, midfoot portion 12, heel portion 14, lateral side 16 and medial side 18 may be used to refer to portions/sides of individual components of last system 100, including last member 102 and/or exterior layer 104.

For consistency and convenience, directional adjectives are employed throughout this detailed description corresponding to the illustrated embodiments. The term "longitudinal" as used throughout this detailed description and in the claims refers to a direction extending a length of a component (e.g., a last system). In some cases, the longitudinal direction may extend from a forefoot portion to a heel portion of the component. Also, the term "lateral" as used throughout this detailed description and in the claims refers to a direction extending along a width of a component. In other words, the lateral direction may extend between a medial side and a lateral side of a component. Furthermore, the term "vertical" as used throughout this detailed description and in the claims refers to a direction generally perpendicular to a lateral and longitudinal direction. For example, the vertical direction of last system 100 may generally extend from bottom side 110 of last system 100 to top side 112 of last system 100. In addition, as used herein, the terms "outer" and "inner" (e.g., outer surface and inner surface or outer portion and inner portion) refer to related portions and/or surfaces. The outer portion or outer surface of a component may be disposed further from a reference interior location (e.g., a central axis, interior void, etc.) than the inner portion or surface of a component.

The geometry of last member 102 may vary in different embodiments. In some embodiments, last member 102 may have the approximate geometry of a foot. Any of the geometries for footwear lasts known in the art could be used. Of course, in some other embodiments, last member 102 could include other geometric features that do not correspond to a foot. Such features could include flanges, handles, openings, or other features. For example, some embodiments can include geometric features that allow a last to be mounted or otherwise attached to a machine, stand or fixture during the manufacturing process.

The dimensions of last member 102 may vary in different embodiments. Exemplary dimensions may include dimensions commonly associated with footwear lasts, including ranges of dimensions for various different shoes sizes. In some embodiments, for example, last member 102 may be associated with a particular foot size, which may correspond with a given range for the height, length and width.

The materials comprising last member 102 may vary in different embodiments. Exemplary materials that may be used for last member 102 include, but are not limited to: woods, metals, plastics, rubbers, composite materials as well as possibly other materials. In some embodiments, last member 102 could be made of a thermosetting polymer. In other embodiments, last member 102 could be made of a thermoplastic polymer. It is contemplated that in at least some embodiments, last member 102 may be made of a material known for use in printing three-dimensional objects, as discussed in further detail below.

The geometry of exterior layer 104 may vary in different embodiments. In some embodiments, exterior layer 104 may comprise a relatively thin layer of material formed on the outer surface 106 of last member 102. For example, in the exemplary embodiment, forefoot portion 10 of last member 102 may have a radial thickness 130 as measured from a central axis 132 to outer surface 106 of last member 102. In contrast, exterior layer 104 may have a thickness 140, as measured between an inner surface 107 of exterior layer 104 and an outer surface 108 of exterior layer 104. In some embodiments, thickness 130 may be substantially greater than thickness 140. In other words, at least some portions of last member 102 (e.g., a forefoot portion) may be substantially thicker than exterior layer 104. In some cases, thickness 130 could be five to ten times greater than thickness 140. In other cases, thickness 140 could be ten to twenty times greater than thickness 140. As one example, thickness 130 could have a value of three to eight centimeters, while thickness 140 may be on the order of one to ten millimeters.

In the embodiments shown in FIGS. 1-17, exterior layer 104 may have a substantially constant thickness. However, in other embodiments, exterior layer 104 could have a thickness that varies over different regions of last system 100. Embodiments with varying thicknesses for an exterior layer are discussed below and shown in FIGS. 18-23.

The material characteristics of last member 102 and exterior layer 104 could vary. For example, in different embodiments, the relative rigidity and/or hardness of last member 102 and exterior layer 104 could vary. For purposes of comparison, last member 102 may be characterized by a first rigidity and exterior layer 104 may be characterized by a second rigidity. In some embodiments, the first rigidity may be greater than the second rigidity (e.g., last member 102 may be more rigid than exterior layer 104). In other embodiments, the second rigidity may be greater than the first rigidity (e.g., exterior layer 104 may be more rigid than last member 102). In still other embodiments, the first rigidity could be substantially equal to the second rigidity (e.g., last member 102 and exterior layer 104 may be equally rigid). In an exemplary embodiment, exterior layer 104 may be less rigid than last member 102.

In different embodiments, exterior layer 104 could be made from different materials. In some embodiments, exterior layer 104 may be made of a heat deformable material. The term "heat deformable material" as used throughout this detailed description and in the claims refers to any material that may become pliable, moldable or that may melt and/or flow when heated. Heat deformable materials could include thermosetting polymers and thermoplastic polymers. In addition, heat deformable materials could also include materials comprised of a combination of thermosetting materials and thermoplastic materials, such as a thermoplastic elastomer (TPE).

Heat deformable materials (e.g., thermosetting polymers and thermoplastic polymers) may be associated with a characteristic temperature. The term "characteristic temperature" as used throughout this detailed description and in the claims refers to a temperature at which one or more properties of a material changes. Such changes may or may not include phase changes. In some cases, for example, the characteristic temperature may be associated with a glass transition of a material, in which case there is no phase change in the material but the material becomes more pliable and/or moldable. In such cases, the characteristic temperature may be associated with the glass-transition temperature of a material. In other cases, the characteristic temperature could be associated with a phase change, such as a change from a solid state to a liquid state (i.e., melting). In such cases, the characteristic temperature could be associated with a melting temperature of a material.

In some embodiments, exterior layer 104 may be made of one or more thermoplastic materials. Thermoplastic materials may become pliable or moldable above a characteristic temperature and then return to a solid state when cooled below the characteristic temperature. The value of the characteristic temperature may be determined according to the specific materials used. Exemplary thermoplastics that could be used for an exterior layer include, but are not limited to: acrylic, nylon, polyethylene, polypropylene, polystyrene, polyvinyl chloride (PVC) and thermoplastic polyurethane (TPU).

When made of different materials, last member 102 and exterior layer 104 may have different melting temperatures and/or glass transition temperatures. In some embodiments, for example, last member 102 could be made of a material with a relatively high glass transition temperature and/or melting temperature. Alternatively, last member 102 may not have a glass transition temperature and/or melting temperature and instead may degrade (e.g., combust) above a characteristic temperature. In contrast, exterior layer 104 may have a relatively low glass transition temperature and/or melting temperature. Thus, for example, if exterior layer 104 is associated with a characteristic temperature, which may be either a glass transition temperature or a melting temperature, last member 102 may be configured to remain in a solid form at temperatures exceeding the characteristic temperature. Such provisions may allow exterior layer 104 to become pliable and/or melt when last system 100 is heated above the characteristic temperature, while last member 102 remains in a solid form to maintain the desired foot geometry.

Figure 2:
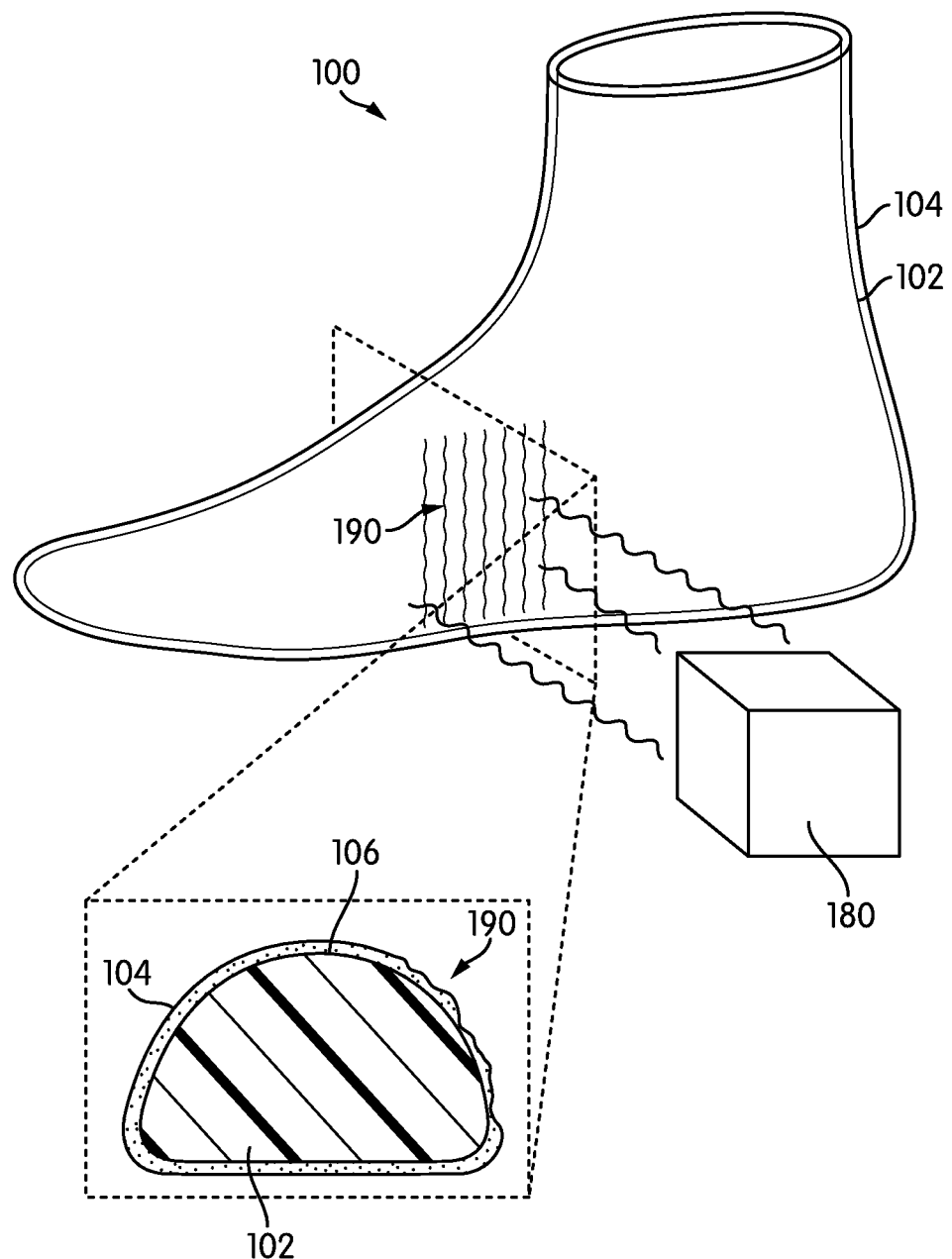
FIG. 2 is a schematic view of an embodiment of a last system undergoing heating.

FIG. 2 is a schematic view of last system 100 undergoing heating by a heat source 180. Heat source 180 could be any kind of heat source, including, but not limited to: a heating lamp, an electric heater, a flame as well as possibly any other kind of heat source known in the art. For purposes of clarity, heat source 180 is depicted as a single source, though other embodiments could include any other number of heat sources arranged in any configuration around a last system.

As seen in FIG. 2, heat source 180 raises the temperature of a portion 190 last system 100 above a characteristic temperature (e.g., a glass transition temperature and/or a melting temperature associated with exterior layer 104). Above this characteristic temperature, exterior layer 104 may become pliable and/or melt. Thus, as seen in the enlarged cross-sectional view, portion 190 has started to melt on outer surface 106 of last member 102. Moreover, it is clear that last member 102 retains its shape and does not deform even when heated above the characteristic temperature.

In different embodiments, heat source 180 may be configured to operate in a range of temperatures. In some embodiments, heat source 180 may heat portions (or all) of last system 100 to a temperature approximately in the range between 100 and 200 degrees Celsius. In other embodiments, heat source 180 may heat portions (or all) of last system 100 to a temperature approximately in the range between 150 and 300 degrees Celsius. In still other embodiments, heat source 180 may heat portions (or all) of last system 100 to a temperature substantially greater than 300 degrees Celsius. Moreover, in some other embodiments, heat source 180 could heat portions (or all) of last system 100 to a temperature less than 100 degrees Celsius. It will be understood that the operating range of heat source 180 may be selected according to the types of materials used to make last system 100 (e.g., the materials comprising last member 102 and exterior layer 104), as well as possibly other manufacturing considerations. Specifically, in some cases, the operating range of heat source 180 may be selected so that an exterior layer of a last system can be heated above a glass-transition temperature and/or melting point, while remaining below a temperature at which a last member becomes pliable, melts and/or degrades.

Embodiments can include provisions for forming a last system using an additive manufacturing process. In some embodiments, a last member and/or an exterior layer could be built using an additive manufacturing process. In one embodiment, last member 102 and exterior layer 104 may both be built using an additive manufacturing process.

Figure 3:
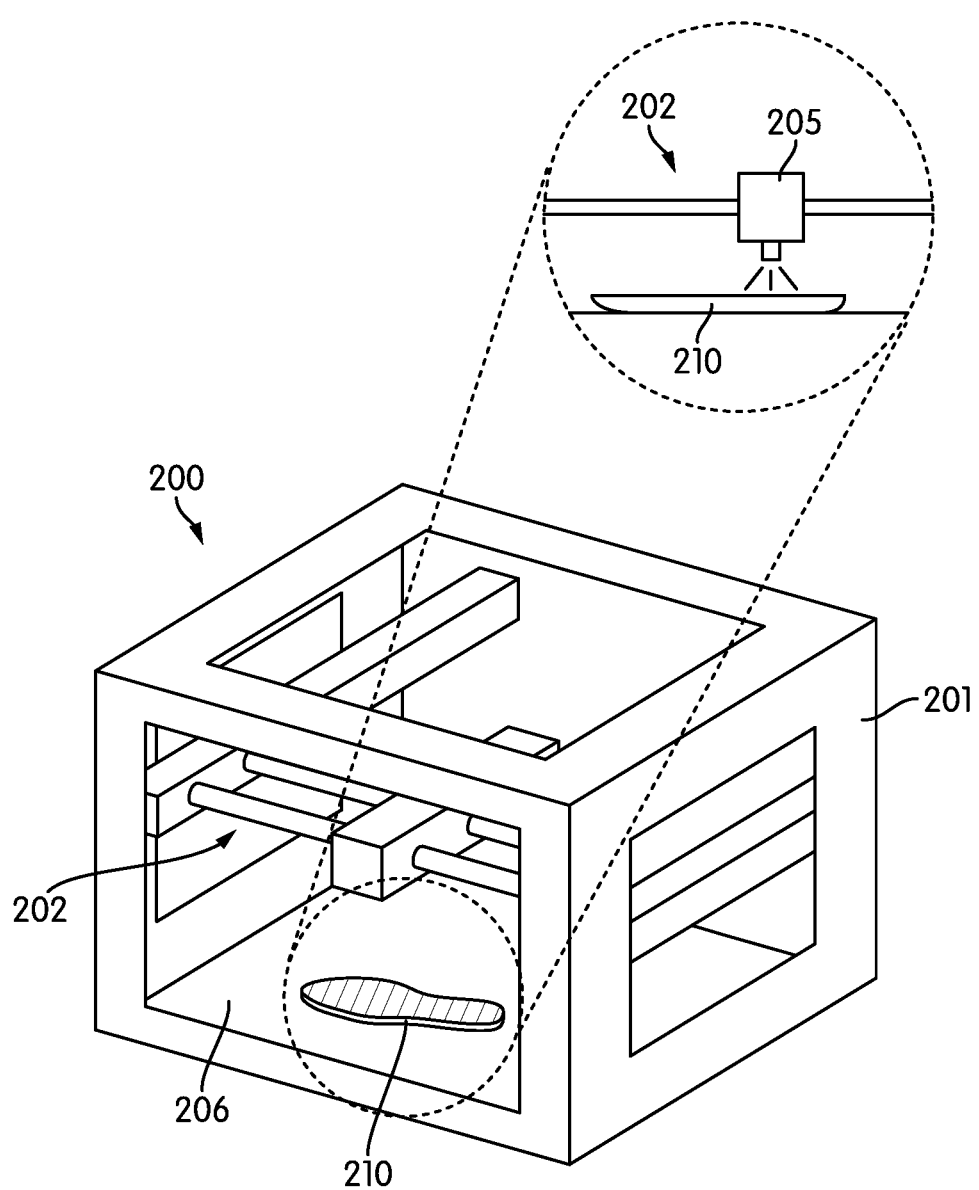
FIGS. 3-5 are schematic views of steps of forming a last member using an additive manufacturing machine, according to an embodiment.
Figure 4:
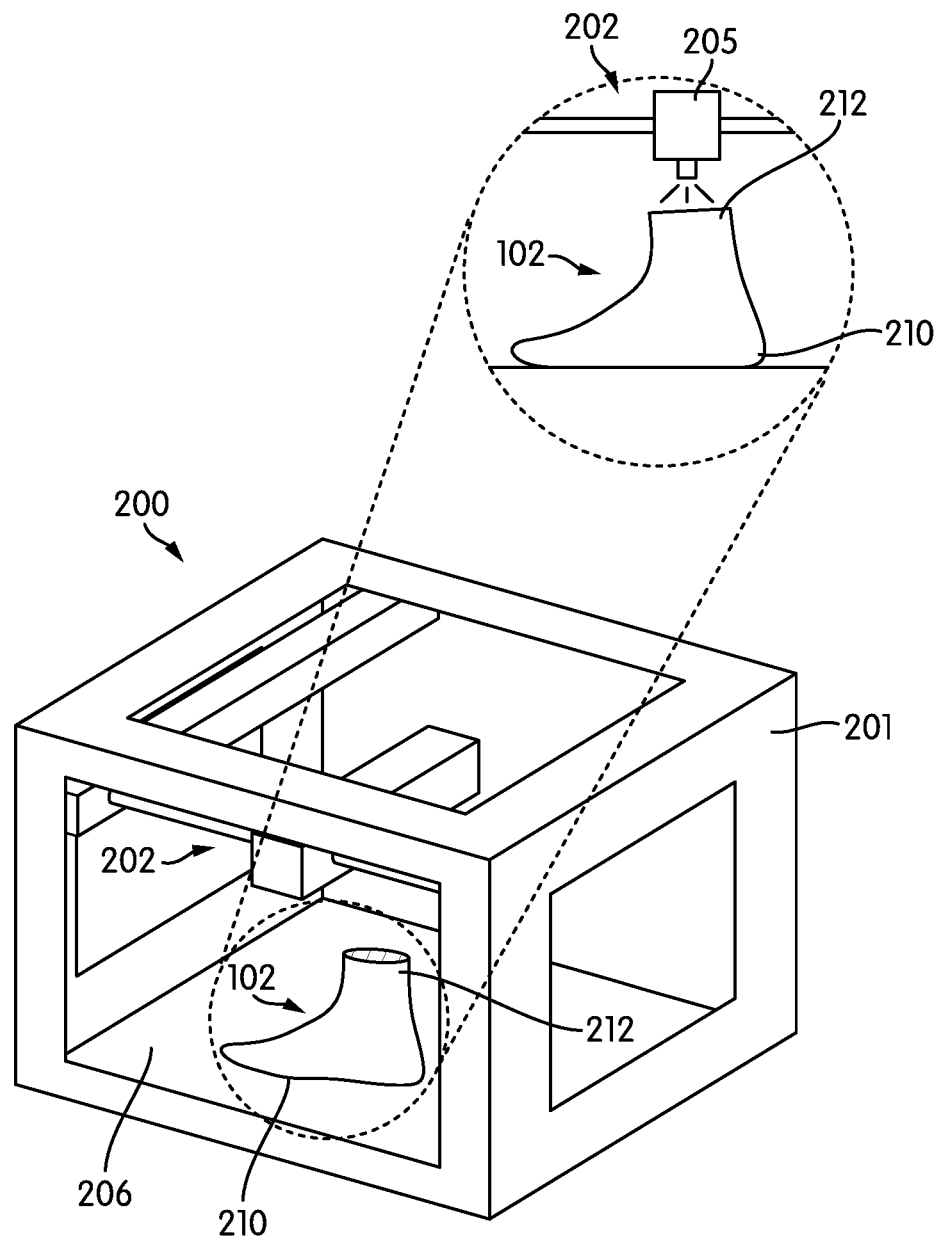
Figure 5:
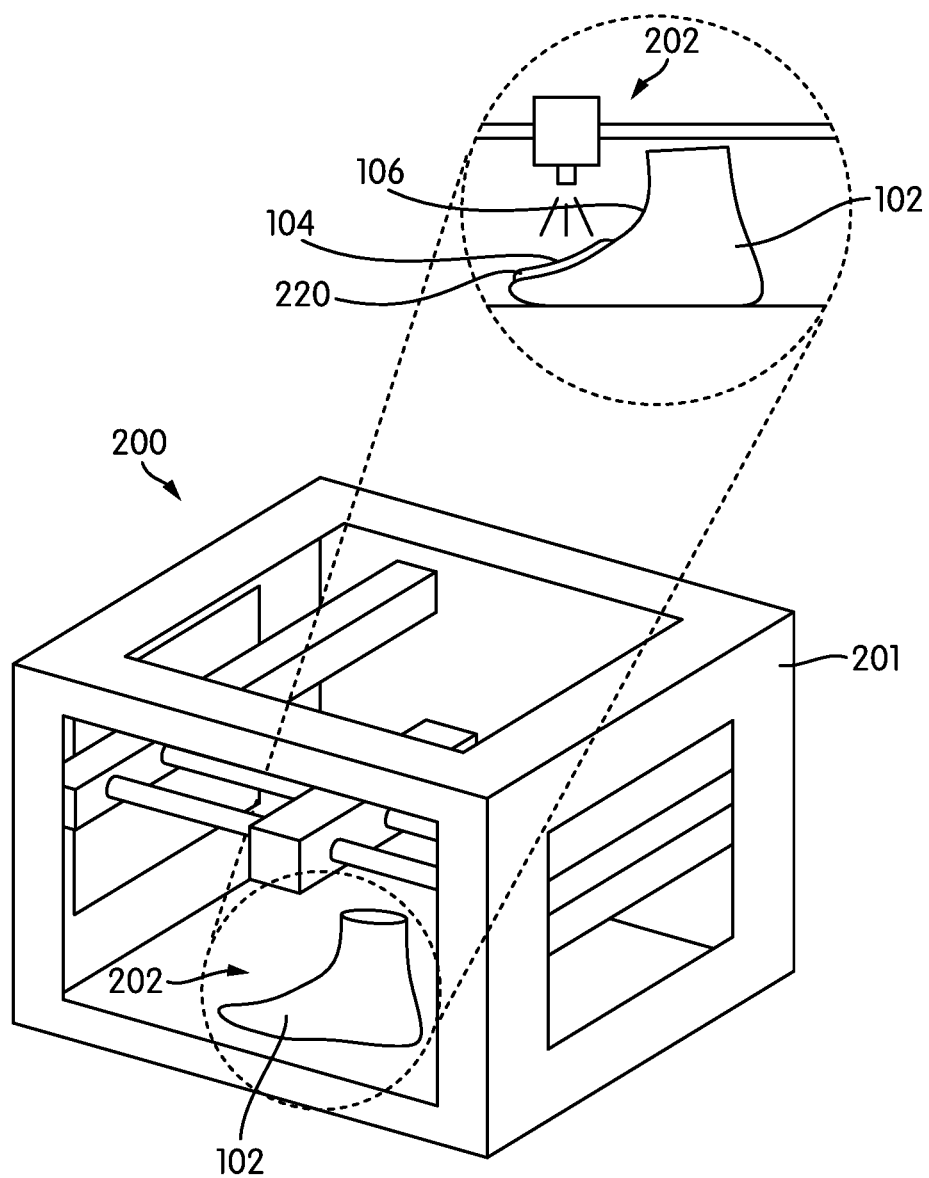
Figure 6:
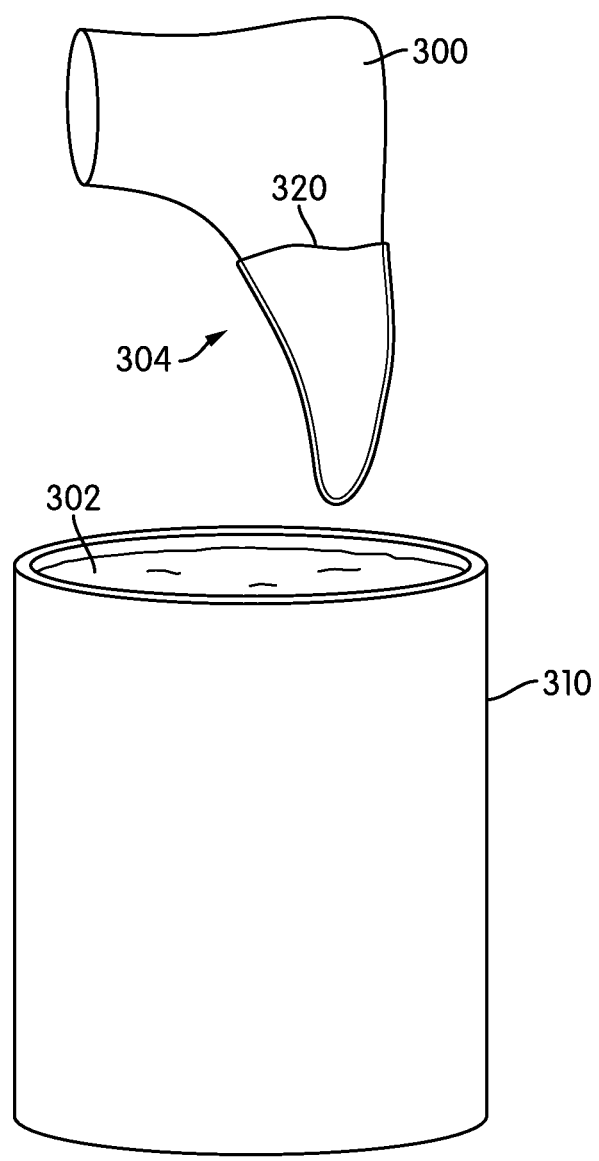
FIG. 6 is a schematic view of an embodiment of another method of applying an exterior layer to a last member.

FIGS. 3-5 illustrate a schematic view of steps in a process for manufacturing last system 100 using an additive manufacturing device 200. The term "additive manufacturing", also referred to as "three-dimensional printing", refers to any technology for making a three-dimensional object through an additive process where layers of material are successively laid down under the control of a computer. Exemplary additive manufacturing techniques that could be used include, but are not limited to: extrusion methods such as fused deposition modeling (FDM), electron beam freeform fabrication (EBF), direct metal laser sintering (DMLS), electron-beam melting (EBM), selective laser melting (SLM), selective heat sintering (SHS), selective laser sintering (SLS), plaster-based 3D printing, laminated object manufacturing (LOM), stereolithography (SLA) and digital light processing (DLP). In one embodiment, additive manufacturing device 200 could be a fused deposition modeling type printer configured to print thermoplastic materials such as acrylonitrile butadiene styrene (ABS) or polyactic acid (PLA).

An example of a printing device using fused filament fabrication (FFF) is disclosed in Crump, U.S. Pat. No. 5,121,329, filed Oct. 30, 1989 and titled "Apparatus and Method for Creating Three-Dimensional Objects," which application is herein incorporated by reference and referred to hereafter as the "3D Objects" application. Embodiments of the present disclosure can make use of any of the systems, components, devices and methods disclosed in the 3D Objects application.

Additive manufacturing device 200 may be used to manufacture one or more components used in forming an article of footwear. For example, additive manufacturing device 200 may be used to form a footwear last (or simply "last"), which may be used in forming an upper of an article of footwear. Additionally, in at least some embodiments, additive manufacturing device 200 could be used to form other components for an article of footwear, including, but not limited to: sole components (e.g., insole components, midsole components and/or outsole components), trim components, overlay components, eye-stays, panels or other portions for an upper, as well as possibly other components. Such provisions may utilize any of the systems and/or components disclosed in Sterman, U.S. Patent Publication Number 2015/0321418, now U.S. patent application Ser. No. 14/273,726, filed May 9, 2014, and titled "System and Method for Forming Three-Dimensional Structures," the entirety of this application being herein incorporated by reference.

As shown in FIGS. 3-4, additive manufacturing device 200 may include a device housing 201, an actuating assembly 202 and extrusion head 205. Additive manufacturing device 200 may also include platform 206. In some cases, extrusion head 205 may be translated via actuating assembly 202 on a z-axis (i.e., vertical axis), while platform 206 of additive manufacturing device 200 may move in the x and y directions (i.e., horizontal axis). In other cases, extrusion head 205 could have full three-dimensional movement (e.g., x-y-z movement) above a fixed platform.

FIGS. 3-4 depict how customized last member 102 is formed using additive manufacturing device 200. Specifically, last member 102 is formed as extrusion head 205 lays down successive layers of material. For example, FIG. 3 shows an initial layer 210 of last member 102 being formed. In FIG. 4, a final layer 212 of last member 102 has been formed.

In some embodiments, exterior layer 104 may also be formed with an additive manufacturing process. As seen in FIG. 5, once last member 102 has been formed, additive manufacturing device 200 may be used to form exterior layer 104 on last member 102. In the embodiment shown in FIG. 5, a top portion 220 of exterior layer 104 has been formed (e.g., printed) onto outer surface 106 of last member 102.

Although the exemplary embodiment depicts last member 102 being completely formed before exterior layer 104 is added, in other embodiments last member 102 and exterior layer 104 could be manufactured such that some portions of exterior layer 104 are extruded before last member 102 has been completely formed. For example, in another embodiment, the forefoot portion of last member 102 and the associated forefoot portions of exterior layer 104 may be formed before the midfoot and/or heel portions of last member 102 (and exterior layer 104) are formed.

It will also be understood that in other embodiments last system 100 may be formed in any other manner. For example, in one alternative embodiment shown in FIG. 6, a last member 300 may be associated with a container 310 of moldable material 302 (e.g., a melted thermoplastic material). Upon dipping a portion 304 of last member 300 into moldable material 302, portion 304 may be covered with a layer 320 of moldable material 302. Layer 320 may solidify to form a portion of an exterior layer on last member 300. Although only a portion of last member 300 is covered in this example, it will be understood that such a method could be used to form an exterior layer over the entire exterior of last member 300. In still other embodiments, a material for forming an exterior layer could be sprayed onto last member 300 or otherwise applied with heat and/or pressure.

Figure 7:
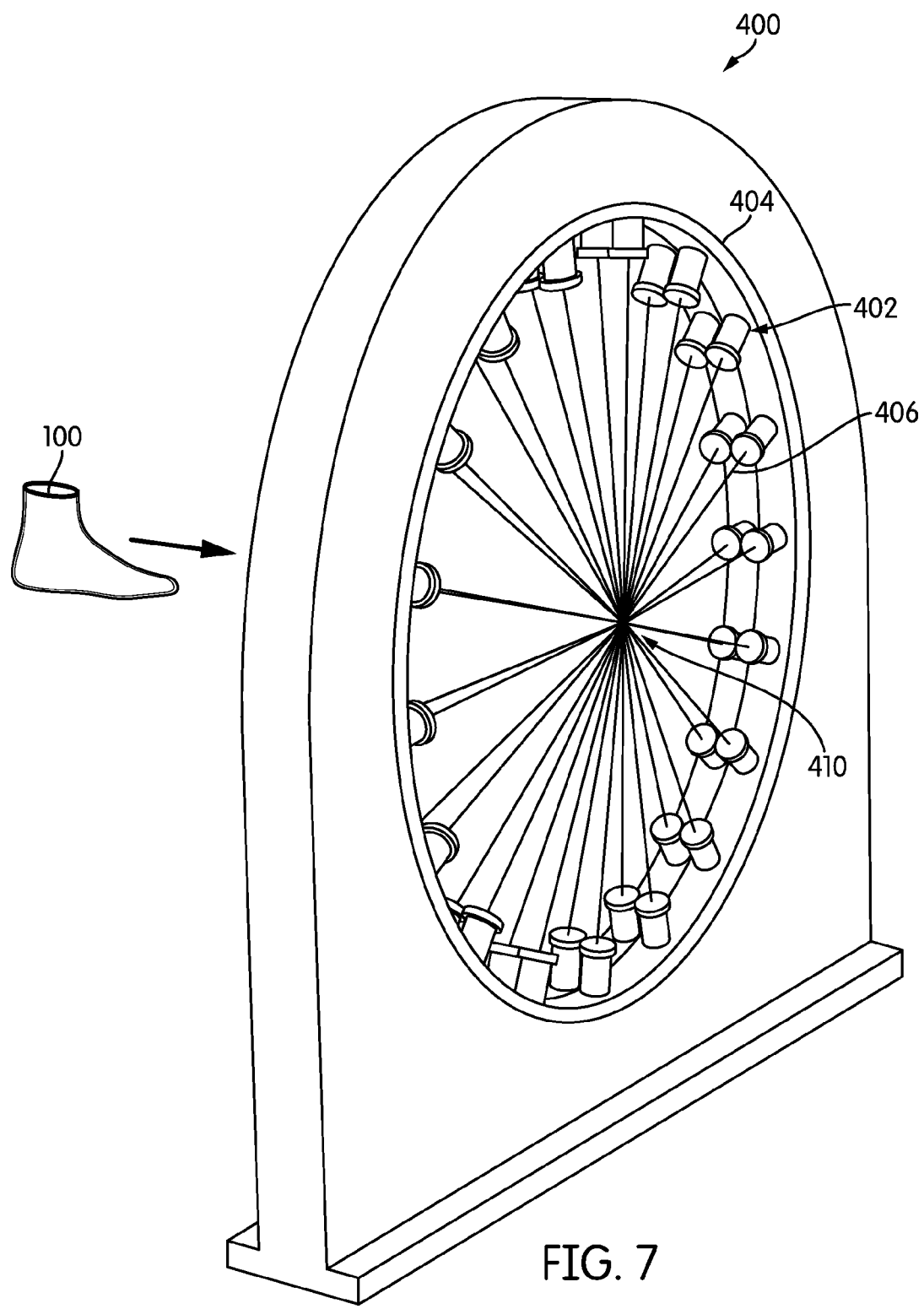
FIGS. 7-8 are schematic views of steps of forming a braided footwear component on a last system, according to an embodiment.
Figure 8:
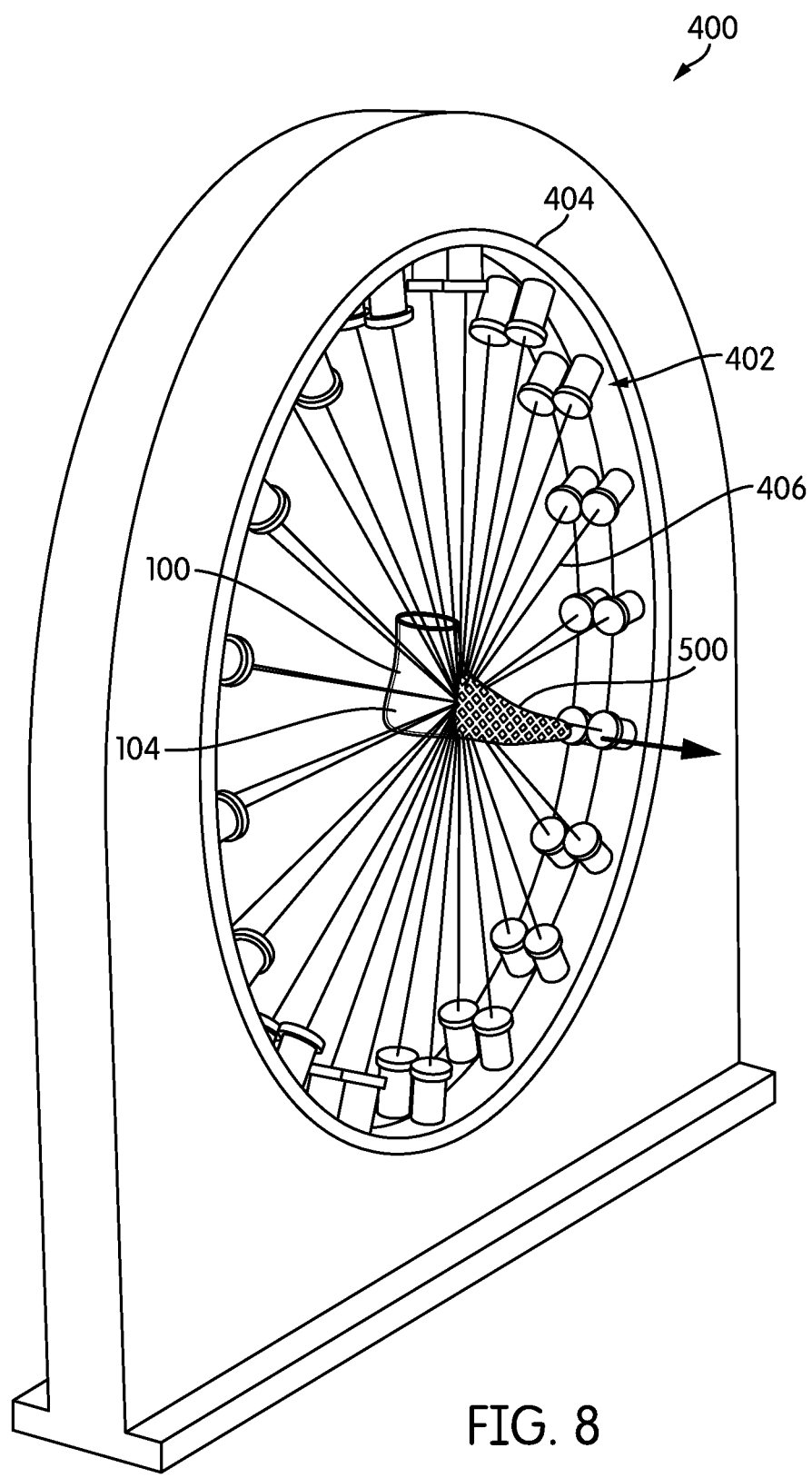

FIGS. 7-8 illustrate schematic views of a method of forming a braided footwear component onto last system 100 using a braiding device 400. Exemplary braiding devices could include any overbraiding devices, radial braiding devices and three-dimensional braiding devices. Braiding device 400 may be configured to apply tensile elements (e.g., threads) onto a last in order to form braided strands over the last. To this end, braiding device 400 may be configured with a plurality of spools 402 that are arranged on a perimeter portion 404 of braiding device 400. Threads 406 from spools 402 may be fed radially inwards towards a central braiding area 410.

The exemplary method provides a braided footwear component on a last system. The term "braided footwear component" (or simply "braided component") as used throughout this detailed description and in the claims refers to any arrangement of tensile strands (e.g., threads, yarns, etc.) where some tensile strands are braided with others. Moreover, braiding as used herein refers to any arrangement where three or more strands of material are intertwined.

In embodiments utilizing a braiding device for making an upper, the materials used to manufacture the upper may primarily be comprised of various kinds of tensile elements (or tensile strands) that can be formed into an upper using the braiding device. Such tensile elements could include, but are not limited to: threads, yarns, strings, wires, cables as well as possibly other kinds of tensile elements. As used herein, tensile elements may describe generally elongated materials with lengths much greater than corresponding diameters. In other words, tensile elements may be approximately one-dimensional elements, in contrast to sheets or layers of textile materials that may generally be approximately two-dimensional (e.g., with thicknesses much less than their lengths and widths). The exemplary embodiment illustrates the use of various kinds of threads, however it will be understood that any other kinds of tensile elements that are compatible with a braiding device could be used in other embodiments.

Exemplary threads or yarns that may be used with a braiding device include fibers made from materials including, but not limited to: wool, flax, and cotton, as well as other one-dimensional materials. The fibers may be formed from animal, plant, mineral, and synthetic sources. Animal material may include, for example, hair, animal fur, animal skin, silk, etc. Plant material may include, for example, grass, rush, hemp, sisal, etc. Mineral material may include, for example, basalt fiber, glass fiber, metal fiber, etc. Synthetic fibers may include, for example, polyester, aramid, acrylic, carbon fiber, as well as other synthetic materials.

In FIG. 7, the process of forming a braided footwear component onto last system 100 may begin by associating last system 100 with braiding device 400. In some cases, last system 100 may be aligned in a particular orientation with braiding device 400, such that a desired portion of last system 100 is aligned with a central braiding area 410 of last system 100.

In FIG. 8, last system 100 may be fed through central braiding area 410 of braiding device 400 to form a braided footwear component in the form of a braided upper. In some embodiments, last system 100 may be manually fed through braiding device 400 by an operator. In other embodiments, a continuous last feeding system can be used to feed last system 100 through braiding device 400. The present embodiments could make use of any of the methods and systems for forming a braided upper as disclosed in Bruce, U.S. Patent Publication Number 2015/0007451, now U.S. patent application Ser. No. 14/495,252, filed Sep. 24, 2014, and titled "Article of Footwear with Braided Upper," the entirety of which is herein incorporated by reference. Moreover, some embodiments could include additional provisions for holding and/or feeding articles through the braiding device. For example, some embodiments may include support platforms, rails, conveyors or other structures that can facilitate feeding articles through the braiding device.

As shown in FIG. 8, as last system 100 is fed through braiding device 400, a braided footwear component 500 is formed around last member 102. Specifically, braided footwear component 500 is formed onto an outer surface of exterior layer 104 of last system 100. In this case, braided footwear component 500 comprises a continuously braided upper component that conforms to last system 100, and therefore has the approximate geometry of last system 100.

Figure 9:
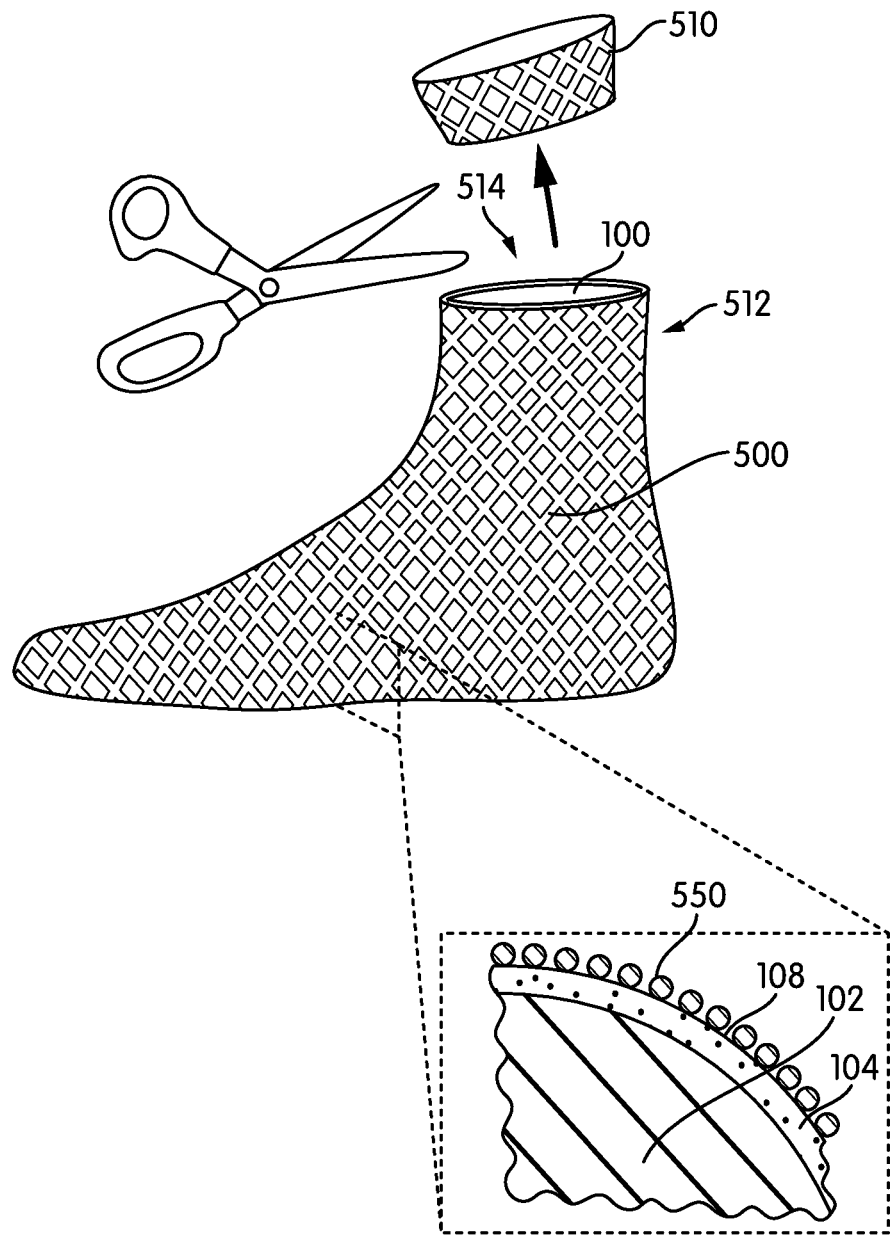
FIG. 9 is a schematic view of a last system after receiving a braided footwear component, including a step of removing a portion of the braided footwear component, according to an embodiment.
Figure 10:
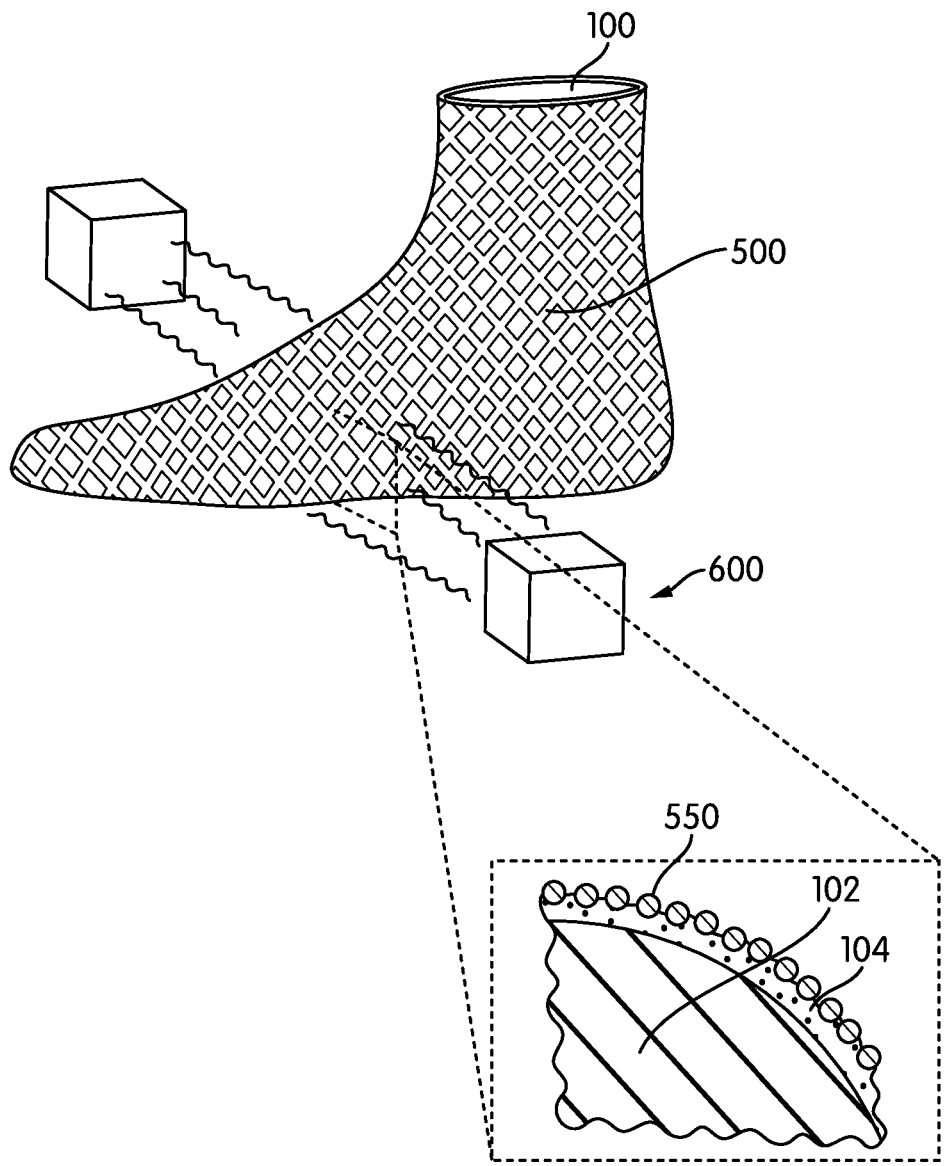
FIGS. 10-11 are schematic views of a braided footwear component and an exterior layer being heated to form a composite structure, according to an embodiment.
Figure 11:
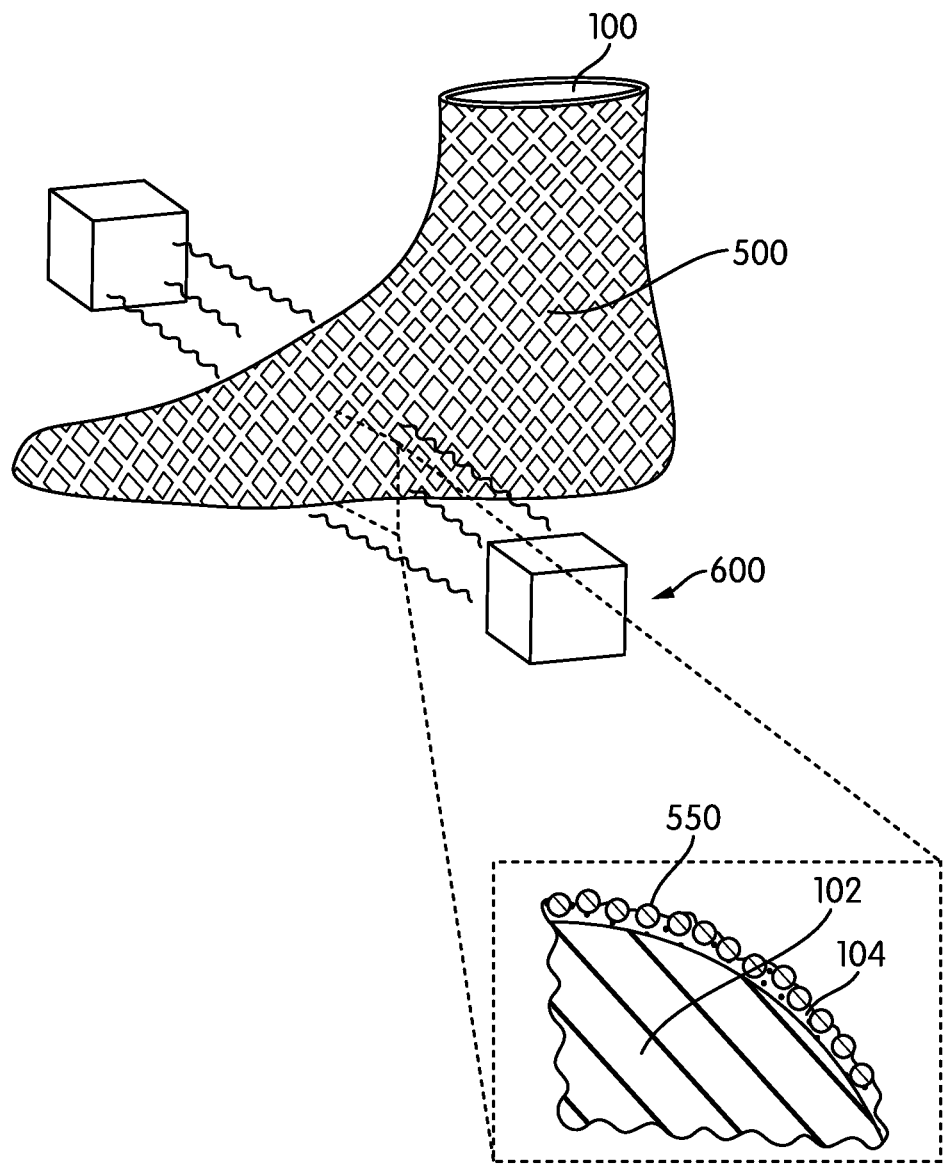

FIGS. 9-11 illustrate steps in a process of joining the strands of a braided footwear component with an exterior layer. As used herein, joining may refer to bonding, fusing, fixing or otherwise attaching strands of a braided footwear component with the material comprising an exterior layer of a last system. Referring first to FIG. 9, after removing last system 100 with braided footwear component 500 from braiding device 400, a portion 510 of braided footwear component 500 may be removed. Specifically, in some cases, portion 510 may be adjacent to a cuff portion 512 of braided footwear component 500, which may create an opening 514 through which last member 102 can eventually be removed.

Initially, in the configuration shown in FIG. 9, strands 550 of braided footwear component 500 are disposed on outer surface 108 of exterior layer 104. In order to begin joining strands 550 and exterior layer 104, last system 100 may be heated using heat sources 600, as shown in FIGS. 10 and 11. For purposes of clarity two heat sources are depicted in FIGS. 10 and 11, however in other embodiments any number of heat sources could be used. Moreover, heat sources 600 could be positioned at any location and/or orientation relative to last system 100. In some cases, heat sources 600 may be configured as part of a station on a conveyor system, so that last system 100 with braided footwear component 500 is automatically moved near heat sources 600 after exiting braiding device 400.

As seen in FIG. 10, exterior layer 104 may become pliable as the temperature of exterior layer 104 is raised above a predetermined temperature (e.g., a characteristic temperature such as a glass transition temperature or a melting temperature). Tension in braided footwear component 500 may tend to pull strands 550 into exterior layer 104 (i.e., radially inward), which is now pliable and capable of receiving strands 550. Referring next to FIG. 11, the material comprising exterior layer 104 becomes pliable enough with continued heating to further mold around strands 550. This allows the material of exterior layer 104 to fill in the spaces between strands 550, thereby partially (or fully) encasing strands 550.

After braided footwear component 500 and exterior layer 104 have been joined or otherwise integrated together, heat sources 600 may be removed. In some cases, braided footwear component 500 and the material comprising exterior layer 104 may be cooled below the predetermined temperature so that the material comprising exterior layer 104 forms a substantially solid material again. In some cases, cooling may be facilitated using fans and/or other cooling mechanisms.

Figure 12:
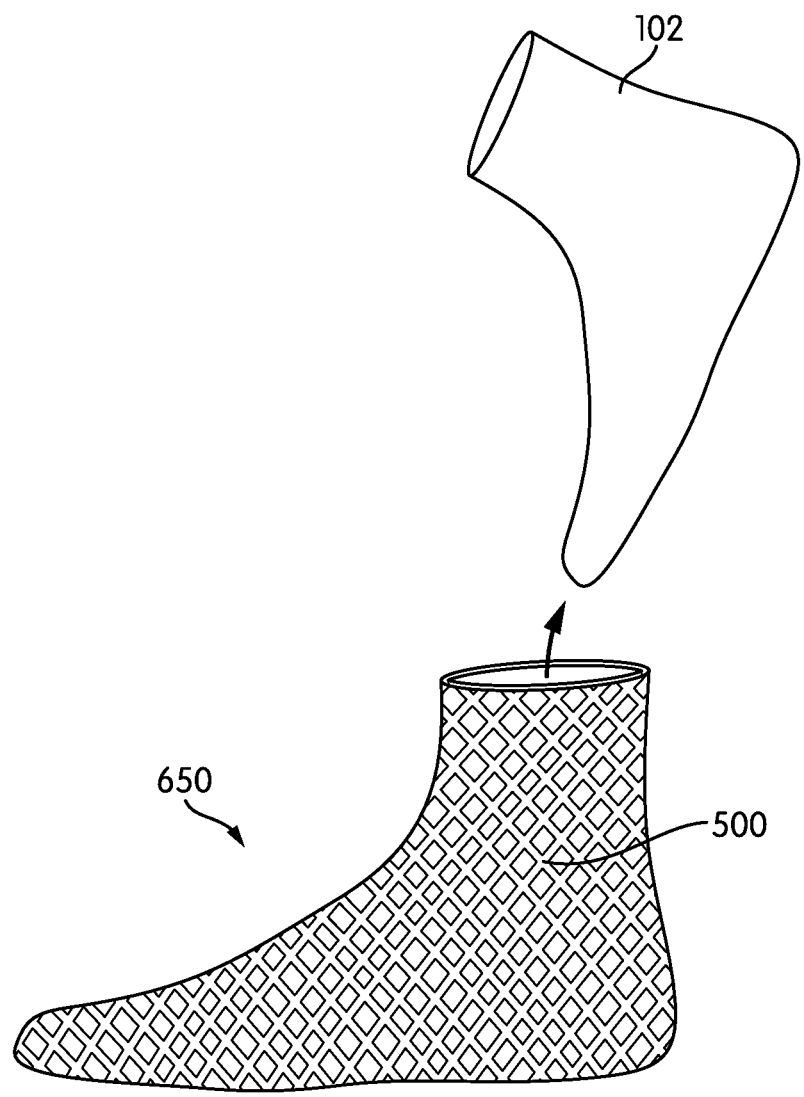
FIG. 12 is a schematic view of a step of removing a last member from a composite structure, according to an embodiment.

As seen in FIG. 12, after cooling, last member 102 may be removed from braided footwear component 500 and exterior layer 104. In some embodiments, braided footwear component 500 and exterior layer 104 have been joined together to form a composite structure 650. Moreover, composite structure 650 may take the form of a footwear upper.

The term "composite structure" as used throughout this detailed description and in the claims refers to a structure comprised of two or more materials. In the exemplary embodiment, the composite structure is configured as a plurality of tensile strands arranged in a braided configuration (i.e., a braided footwear component), where the strands are at least partially fixed to a heat deformable material (e.g., a thermoplastic). The composite structure may have material properties corresponding to both the heat deformable material and the embedded tensile strands. Thus, the heat deformable material, when cooled below a glass-transition temperature (or melting temperature), may act as a bonding agent (e.g., a resin, matrix and/or adhesive) that at least partially coats the tensile strands and limits their relative movement. In particular, the composite structure may provide a more rigid structure than the braided footwear component alone.

For purposes of clarity, the material comprising exterior layer 104, after being joined with braided footwear component 500 and cooled to a solid, may be referred to as a matrix portion of a composite structure. Moreover, the material comprising the matrix portion may be referred to as a matrix material. By joining the strands of a braided footwear component with a matrix portion the strands may be partially fixed in place, thereby reducing the tendency of the strands to become disorganized and/or reducing the tendency of the original braiding pattern to degrade over time. This matrix portion may also impart improved wear resistance, strength, support and even cushioning (depending on the selected matrix material). In some cases, joining the braided footwear component with a matrix portion may also help reduce unwanted stretch in a braided footwear component. Still further, the matrix portion (e.g., a thermoplastic) may fill in spaces between strands to reduce the tendency of dirt and/or debris from entering the article through the upper. In other words, in some cases, a matrix portion may act as a sealant to the open mesh structure of a braided footwear component.

Figure 13:
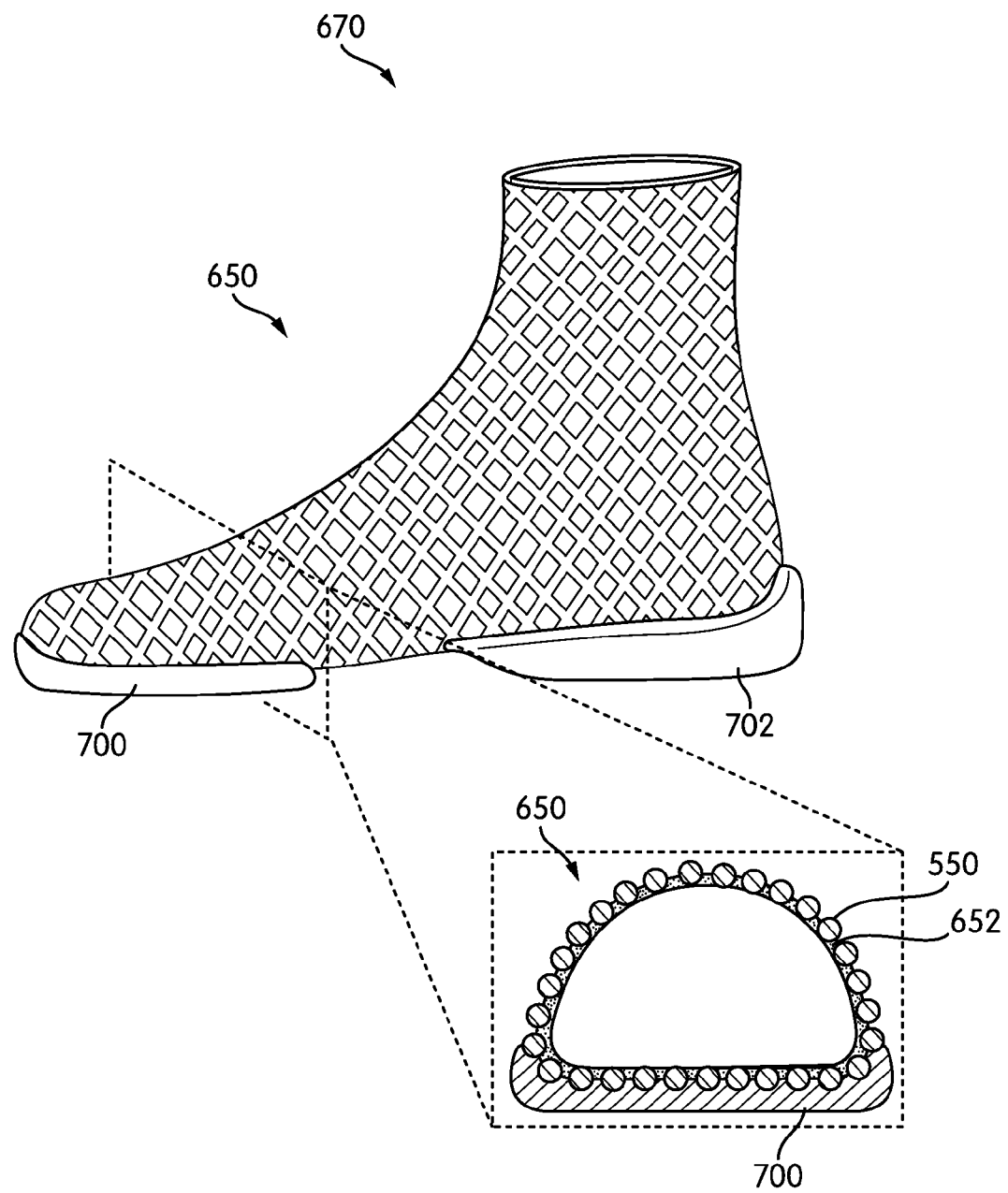
FIG. 13 is a schematic view of a finished article of footwear including a composite structure and sole components, according to an embodiment.

Some embodiments may further include steps of bonding sole elements to composite structure 650. In FIG. 13, an exemplary embodiment includes a first sole component 700 and a second sole component 702, which have bonded to composite structure 650 in order to form a finished article of footwear 670. Sole components could incorporate one or more sole elements, including insole elements, midsole elements and/or outsole elements. Moreover, sole components could be joined to a composite structure (e.g., an upper) using adhesives, stitching, welding or any other methods known in the art for joining uppers and soles.

In FIG. 13, composite structure 650 is seen to be comprised of strands 550 (of a braided footwear component) that are joined with a matrix portion 652. As already discussed, matrix portion 652 is comprised of material (e.g., thermoplastic material) that previously formed exterior layer 104 of last system 100 (see FIG. 1). In this case, matrix portion 652 forms a matrix within which strands 550 may be partially (or fully) embedded.

Figure 14:
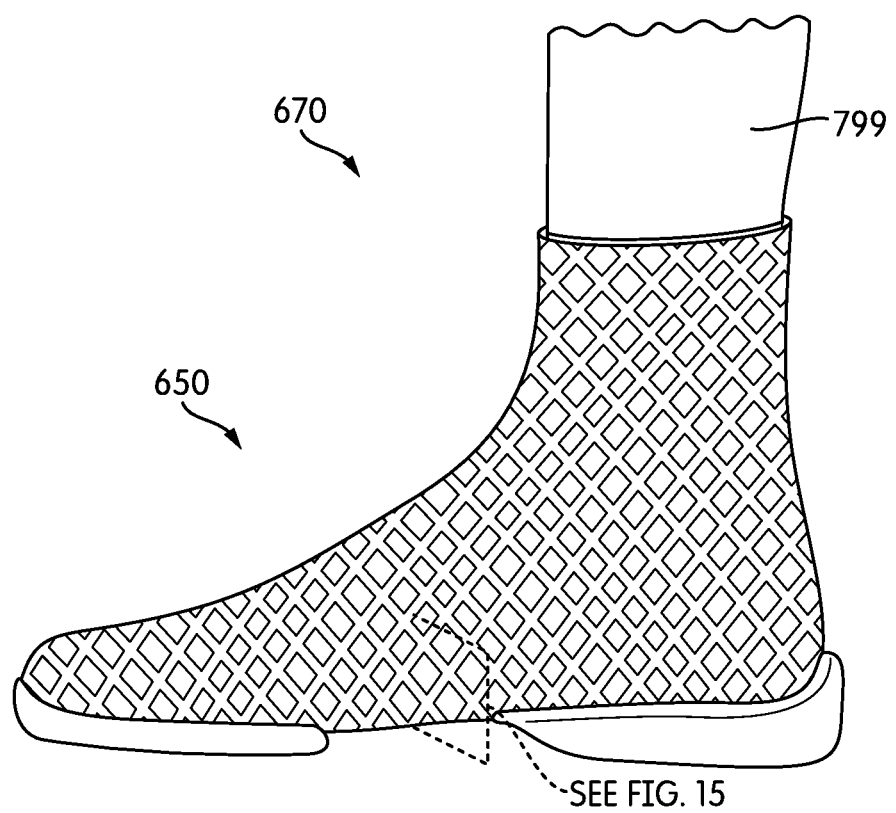
FIG. 14 is a schematic view of an article of footwear being worn by a user, according to an embodiment.
Figure 15:
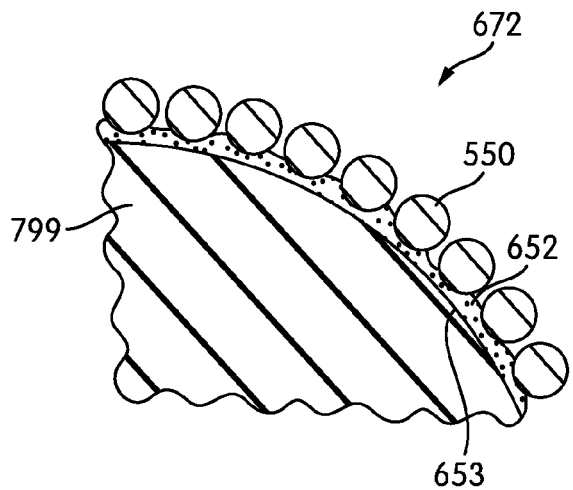
FIG. 15 illustrates a possible configuration for strands in a composite structure, according to a first embodiment.
Figure 16:
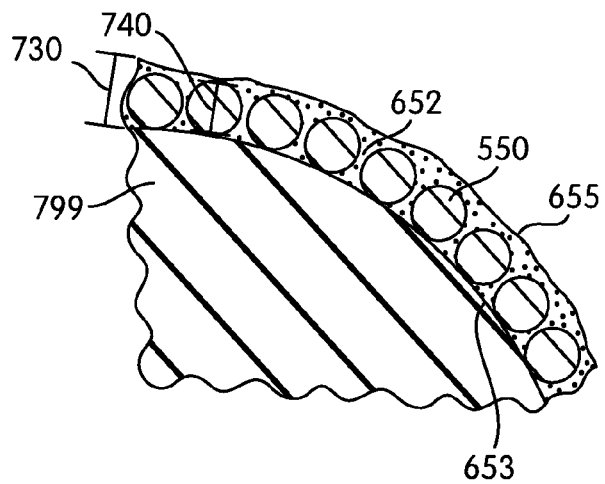
FIG. 16 illustrates a possible configuration for strands in a composite structure, according to a second embodiment.
Figure 17:
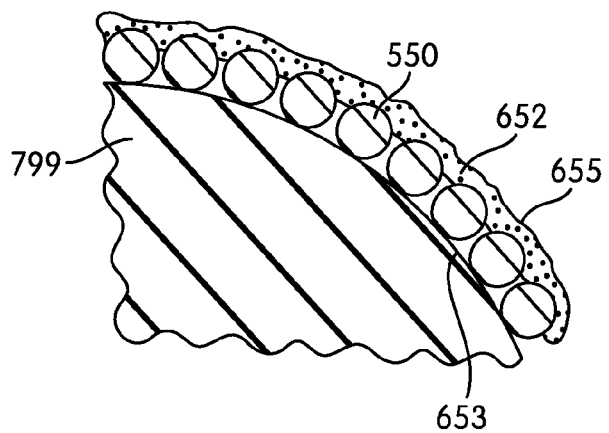
FIG. 17 illustrates a possible configuration for strands in a composite structure, according to a third embodiment.

FIG. 14 illustrates a schematic isometric view of article of footwear 670 as worn on a foot 799 of a user. FIGS. 15-17 illustrate various possible configurations for a composite structure, as taken along a cutting surface indicated in FIG. 14. As seen in FIG. 15, in some embodiments strands 550 may be exposed on an outer surface 672 of article of footwear 670. In this case, strands 550 may be partially, but not fully, embedded within matrix portion 652. Moreover, strands 550 may be separated from foot 799 by an inner surface 653 of matrix portion 652. Such a configuration may be achieved by cooling exterior layer 104 before strands 550 have time to completely pass through exterior layer 104. This configuration may help improve feel with foot 799 by limiting contact between strands 550 and foot 799.

Alternatively, as shown in FIG. 16, strands 550 could be completely encased within matrix portion 652, such that no portions of strands 550 are exposed on either inner surface 653 or outer surface 655 of matrix portion 652. Such a configuration may be achieved by forming matrix portion 652 with a thickness 730 that is substantially greater than a diameter 740 of strands 550. This configuration could improve feel and reduce wear to strands 550, since strands 550 are protected from contact with a foot and objects exterior to article of footwear 670.

In still another configuration, shown in FIG. 17, strands 550 may be partially, but not fully, embedded within matrix portion 652. In this case, strands 550 may be exposed on inner surface 653 of matrix portion 652, but may not be exposed on outer surface 655 of matrix portion 652. Such a configuration may be achieved by allowing time for strands 550 to contract through the entire thickness of exterior layer 104 before cooling exterior layer 104. This configuration could provide increased wear resistance of strands 550 against contact with objects on outer surface 655 of matrix portion 652. Of course, in still other embodiments, matrix portion 652 may be thin enough so that strands 550 are exposed on both an interior surface and an outer surface of matrix portion 652.

Embodiments can include provisions to vary the material characteristics of a composite structure for an article of footwear. In some embodiments, a last system can be configured with an exterior layer having regions or zones with different thicknesses. When bonded with strands of a braided footwear component, the regions or zones of different thicknesses may thereby provide different material characteristics across different zones of the article. These material characteristics could include, but are not limited to: rigidity, hardness, stretch, flexibility, as well as possibly other material characteristics. For example, a first region with a first thickness that is greater than a second thickness of a second region could provide greater rigidity for the first region over the second region.

Figure 18:
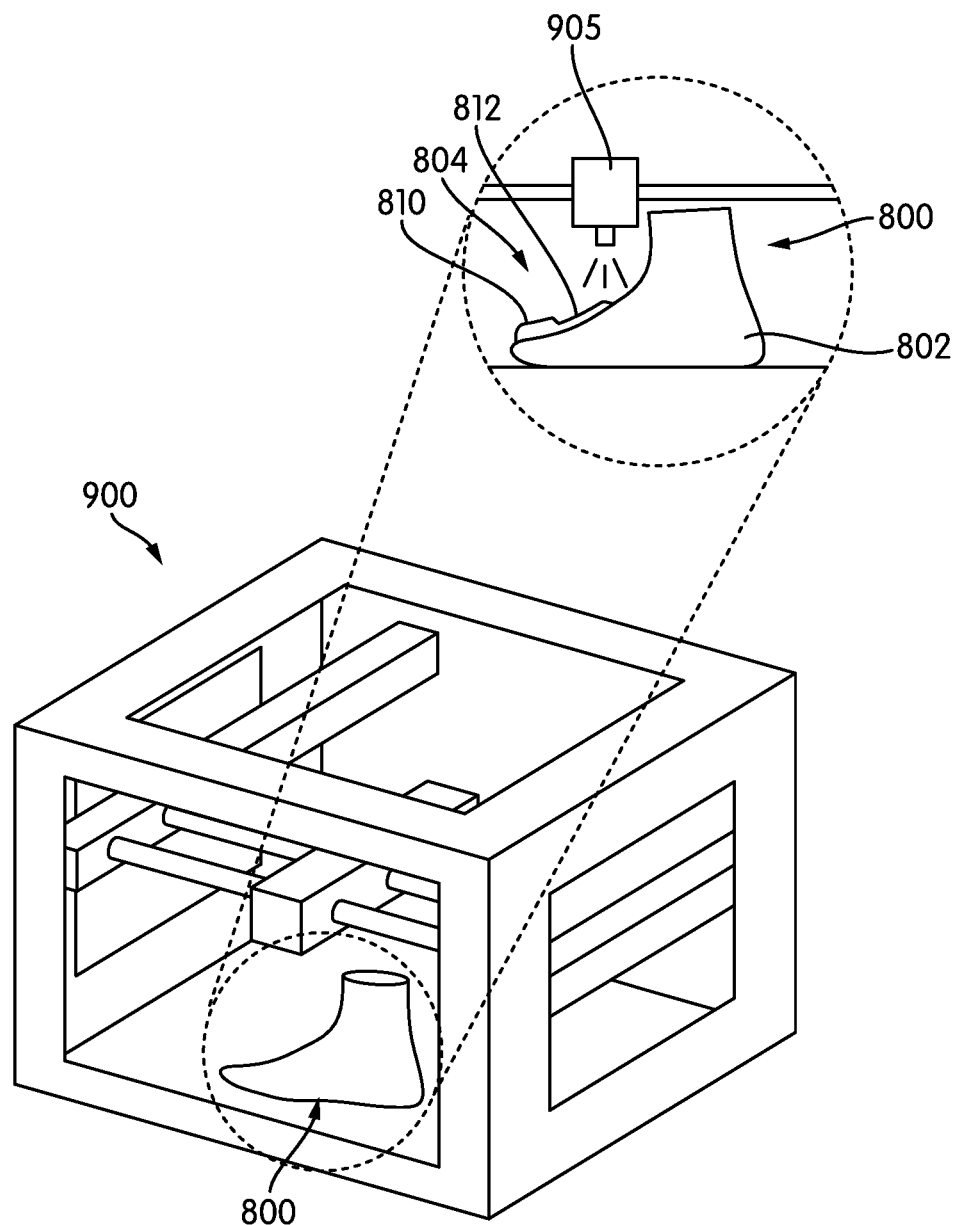
FIG. 18 is a schematic view of a step in a process of making a last system including regions of varying thickness, according to an embodiment.

FIG. 18 illustrates a step in a process for forming a last system 800. Referring to FIG. 18, a last member 802 has been formed using additive manufacturing device 900. At this point, an extrusion head 905 of additive manufacturing device 900 is forming an exterior layer 804 of last system 800. More specifically, exterior layer 804 is formed with a toe region 810 and an adjacent vamp region 812. As seen in FIG. 18, toe region 810 has been formed with a greater thickness than vamp region 812. In other words, more material has been laid down onto last system 802 in toe region 810 than in vamp region 812.

Figure 19:
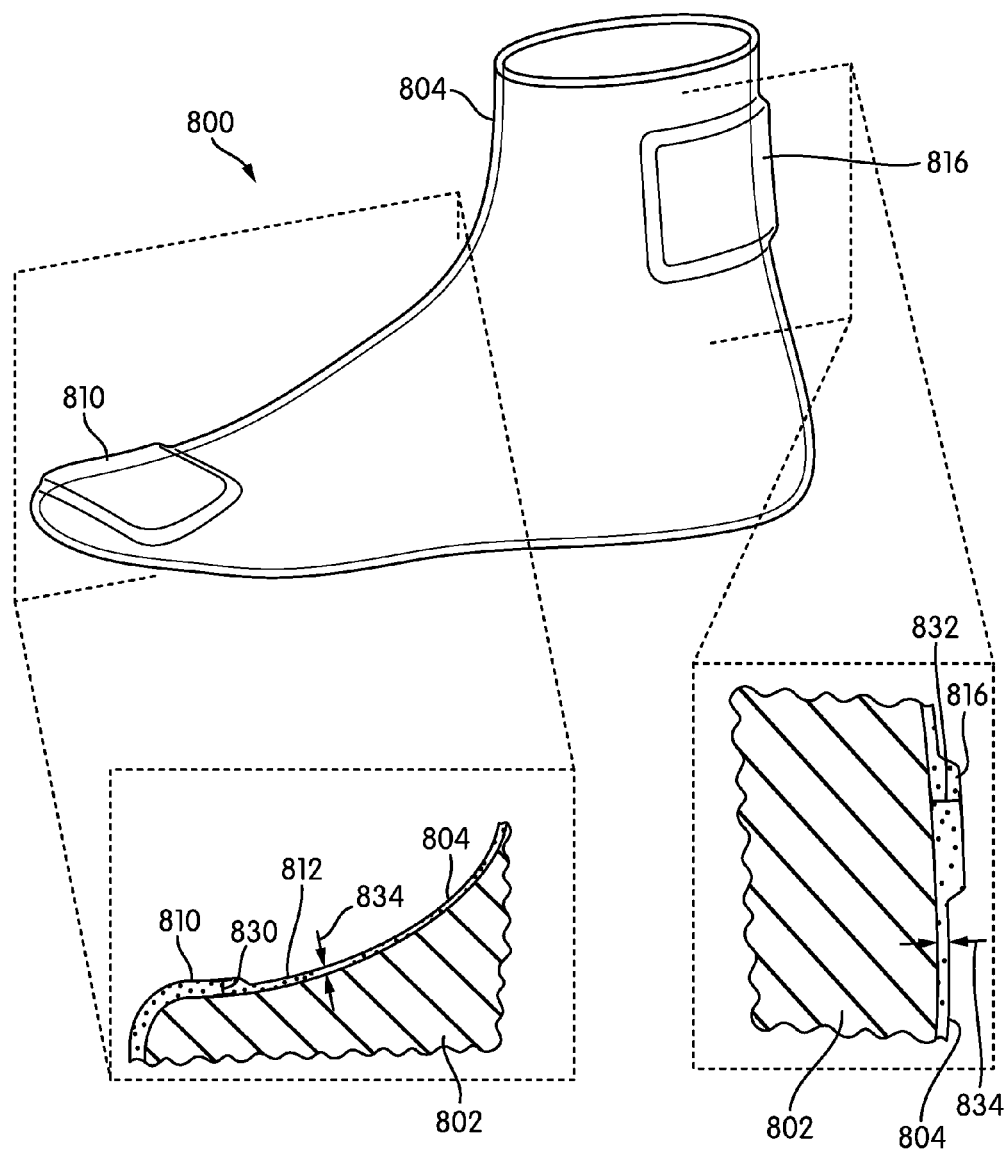
FIG. 19 is a schematic view of an embodiment of a last system having an exterior layer with regions of varying thickness.

FIG. 19 illustrates a schematic view of an embodiment of last system 800 produced by the additive manufacturing process shown in FIG. 18. Referring to FIG. 19, last system 800 includes a toe region 810 as well as an ankle region 816. In this embodiment, both toe region 810 and ankle region 816 have substantially greater thicknesses than the remaining regions of exterior layer 804. Specifically, toe region 810 has a first thickness 830, ankle region 816 has a second thickness 832 and the remaining portions of exterior layer 804 (e.g., vamp region 812) have a third thickness 834. In the exemplary configuration, first thickness 830 is greater than third thickness 834. Additionally, second thickness 832 is also greater than third thickness 834.

Figure 20:
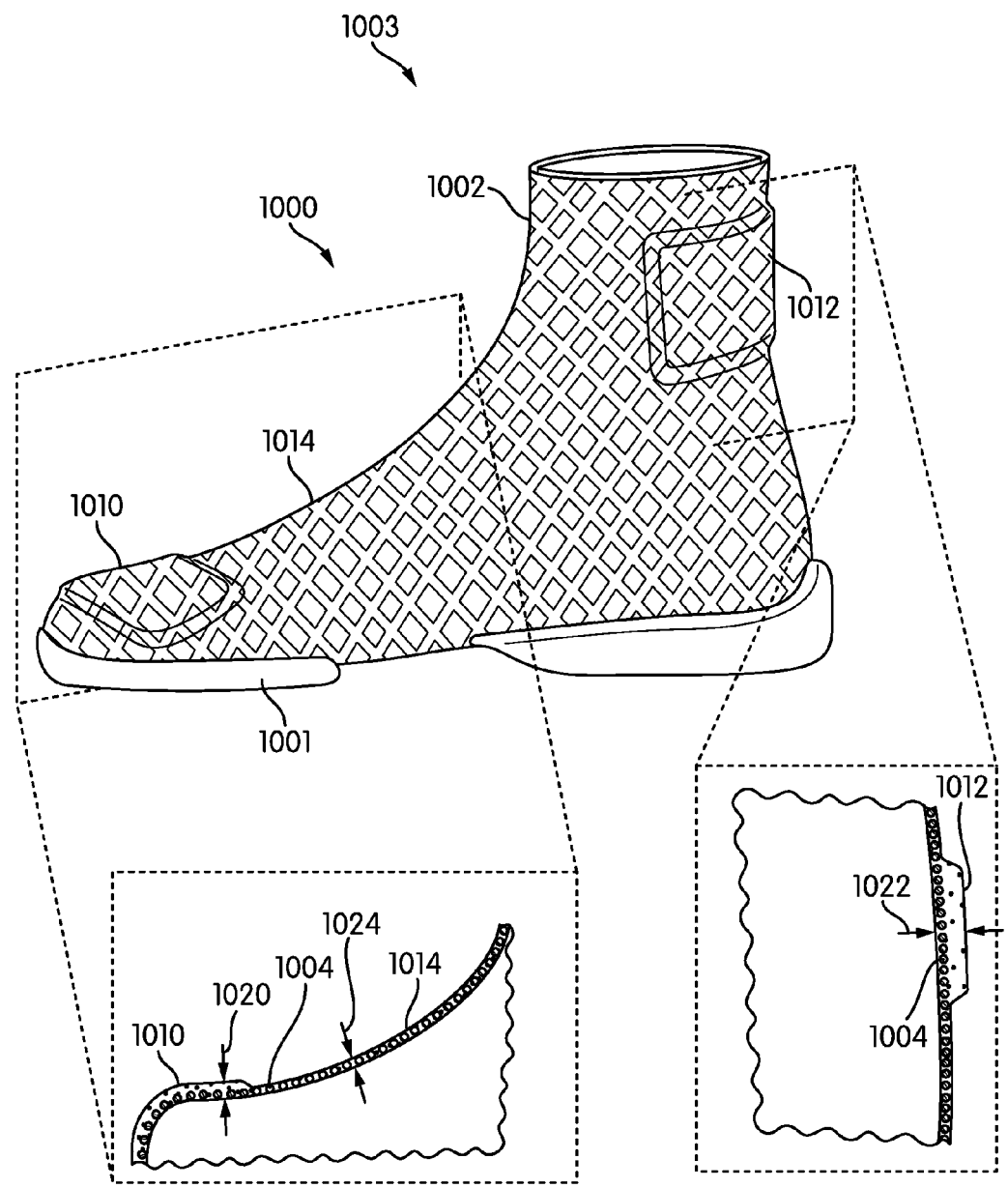
FIG. 20 is a schematic view of an embodiment of a composite structure having regions of varying thickness.

FIG. 20 illustrates an exemplary configuration of composite structure 1000 that may be created by forming a braided footwear component 1002 over last system 800 (see FIG. 19) and applying heat to bond exterior layer 804 with braided footwear component 1002. Additionally, composite structure 1000 may be attached to sole components 1001 to form an article of footwear 1003. Referring to FIGS. 19 and 20, toe region 810 of exterior layer 804 has been combined with strands 1004 of braided footwear component 1002 to form a thickened toe region 1010 for composite structure 1000. Likewise, ankle region 816 of exterior layer 804 has been combined with strands 1004 of braided footwear component 1002 to form a thickened ankle region 1012 for composite structure 1000.

As shown in FIG. 20, toe region 1010 has a first thickness 1020, ankle region 1012 has a second thickness 1022 and the remaining regions of composite structure 1000 (e.g., vamp region 1014) have a third thickness 1024. Moreover, first thickness 1020 is greater than third thickness 1024 and second thickness 1022 is greater than third thickness 1024. This arrangement may result in a more rigid configuration for toe region 1010 and ankle region 1012 as compared to, for example, vamp region 1014 and other regions of composite structure 1000.

Figure 21:
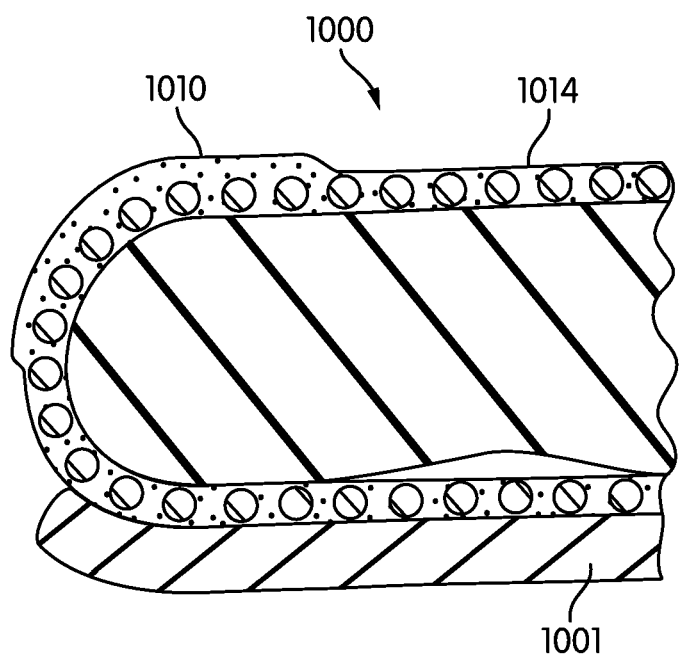
FIGS. 21-22 illustrate schematic views of the response of different regions of a composite structure to applied forces.
Figure 22:
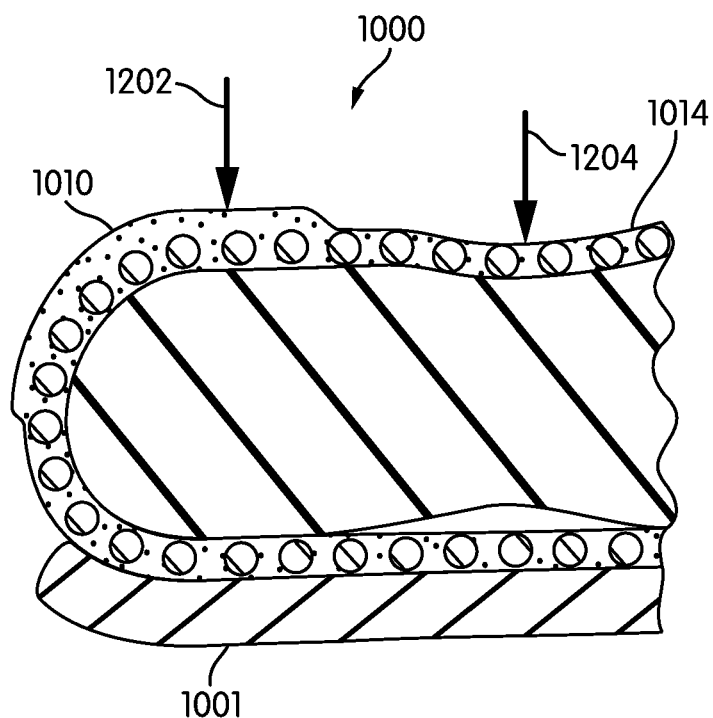

FIGS. 21 and 22 illustrate schematic views of a close up of toe region 1010 and some of vamp region 1014 of composite structure 1000 with a foot 1100 inserted inside an article of footwear including composite structure 1000. FIG. 21 represents a state in which composite structure 1000 is not subjected to any forces, while FIG. 22 represents a state in which forces have been applied to composite structure 1000.

In FIG. 22, a first force 1202 is applied at toe region 1010. Also, a second force 1204 is applied at vamp region 1014. For purposes of comparing the material properties of toe region 1010 and vamp region 1014, it is considered that in this case first force 1202 and second force 1204 are equivalent. Such a force profile could be achieved when a ball strikes against both toe region 1010 and vamp region 1014 of composite structure 1000 simultaneously.

As seen by comparing FIGS. 21 and 22, the relative rigidity of toe region 1010 prevents toe region 1010 from being substantially deformed under the application of first force 1202. In contrast, vamp region 1014 is seen to deform under second force 1204 due to its relatively lower rigidity. This configuration therefore allows for increased protection for the toes. In other words, in some cases, toe region 1010 may function in a similar manner to a toe cap and/or a toe pad to protect the toes. Although FIGS. 21 and 22 illustrate the relative rigidity of toe region 1010 to vamp region 1014, it may be understood that ankle region 1012 may likewise be configured to resist deformations in a similar manner to toe region 1010. This configuration of ankle region 1012 may allow ankle region 1012 to provide similar strength and support to the ankle as toe region 1010 provides to the toes.

Figure 23:
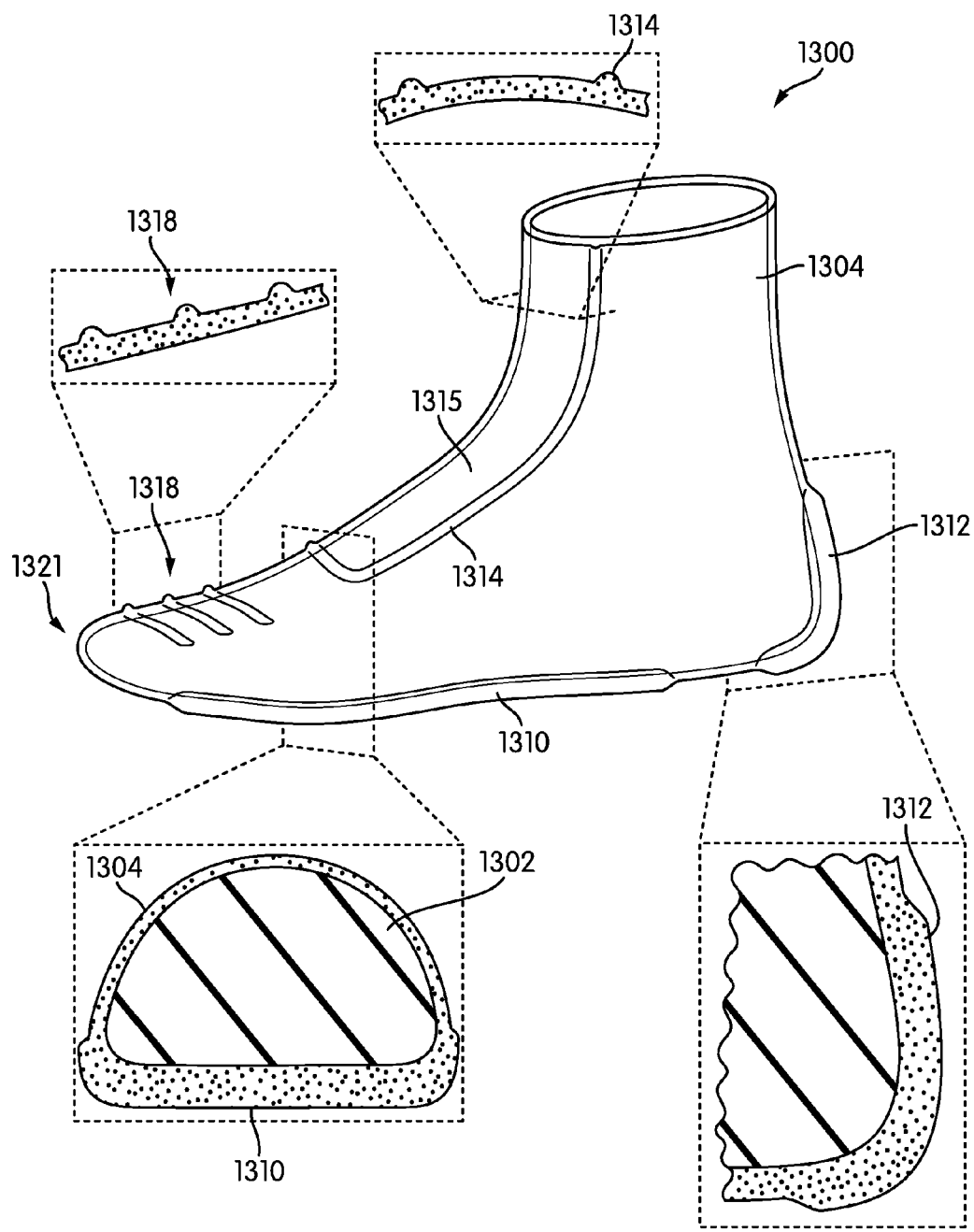
FIG. 23 is a schematic view of an embodiment of a last system including an exterior layer with various different regions of varying thickness.

FIG. 23 illustrates several different zones or regions of varying thickness for an exterior layer of a last system, which may result in corresponding variations in thickness for a composite structure built from the exterior layer and a braided footwear component. Referring to FIG. 23, last system 1300 includes last member 1302 and exterior layer 1304. In some embodiments, exterior layer 1304 may include a thickened bottom sole region 1310, which may provide additional strength, support and possibly cushioning beneath a foot (e.g., to a sole of the foot) when exterior layer 1304 is incorporated into an article of footwear. In some embodiments, exterior layer 1304 may include a thickened heel region 1312, which may provide additional strength, support and possibly cushioning to the heel of a foot when exterior layer 1304 is incorporated into an article of footwear.

The zones of varying thickness may not be limited to regions with large areas. In some cases, zones of varying thickness could be formed in various geometries, including elongated shapes (e.g., ridges, channels, etc.). For example, in some embodiments, exterior layer 1304 may include a thickened eyestay region 1314, which may facilitate improved strength for eyelets in an article incorporating exterior layer 1304. In particular, in some cases, eyelets could be formed as holes within eyestay region 1314 of exterior layer 1304 and could be further reinforced by strands of an associated braided footwear component. Eyestay region 1314 is seen in FIG. 23 to have a generally elongated shape that bounds the perimeter of a fastening region 1315 of last system 1300. In some embodiments, exterior layer 1304 may incorporate thickened ridge regions 1318 (or ridge portions), for example in toe region 1321. These ridge regions 1318 may comprise bands or lines of increased thickness in exterior layer 1304. Such ridges could maintain their approximate shape during the process of forming a composite structure, so that the ridges may provide ball control or other functionality for a finished article of footwear.

Although the following embodiments of composite structures (including exterior layers) are characterized by having various zones or regions that are thicker than the remaining portions of the structures, other embodiments could incorporate regions of substantially less thickness than the remaining portions. For example, it is contemplated that in another embodiment, a majority of a composite structure could have a first thickness, while a region (e.g., a medial side region) could have a second thickness that is substantially less than the first thickness. Such regions of lesser thickness could facilitate increased feel or proprioception on some areas of a foot, since these regions may be less rigid than the remainder of the upper and therefore provide more tactile sensation to a wearer.

It will be understood that other embodiments may use selectively applied regions of a material on an outer surface of a last member. In particular, an exterior layer need not be applied over the entire surface of a last member, and instead could be applied in selected regions. As one example, embodiments could include an exterior layer with separate (e.g., disjoint) regions near the toes, vamp, heel and/or ankle. In such cases, only some portions or regions of a braided component may be joined with an exterior layer so that the resulting structure may comprise separated composite regions. For example, an embodiment could include an upper having a composite region of braided strands embedded in a matrix portion in a toe region, but may only have braided strands (i.e., no matrix portion) in a vamp region. Such selective applications of heat deformable materials may provide regions of variable rigidity for a resulting upper.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A method of making an upper for an article of footwear, comprising:
   providing a last member, the last member having an outer surface;
   forming an exterior layer of a heat deformable material onto the outer surface of the last member;
   forming a braided footwear component onto the exterior layer;
   heating the exterior layer so that the exterior layer is joined with the braided footwear component to form a composite structure; and
   removing the last member from the composite structure.

2. The method according to claim 1, wherein the last member is more rigid than the exterior layer.

3. The method according to claim 1, wherein heating the exterior layer includes heating the exterior layer above a characteristic temperature, wherein the exterior layer is deformable above the characteristic temperature.

4. The method according to claim 3, wherein the characteristic temperature is a glass transition temperature of the material comprising the exterior layer.

5. The method according to claim 3, wherein the characteristic temperature is a melting temperature of the material comprising the exterior layer.

6. The method according to claim 1, wherein forming the braided footwear component onto the exterior layer comprises inserting the last member with the exterior layer through a braiding device.

7. A method of making an upper for an article of footwear, comprising:
providing a last member, the last member having an outer surface;
forming a first region of an exterior layer onto the outer surface of the last member, wherein the first region has a first thickness and wherein the exterior layer is comprised of a heat deformable material;
forming a second region of the exterior layer onto the outer surface of the last member, wherein the second region has a second thickness that is different from the first thickness;
forming a braided footwear component onto the exterior layer;
heating the exterior layer so that the exterior layer is joined with the braided footwear component to form a composite structure; and
removing the last member from the composite structure.

8. The method according to claim 7, wherein the first region of the exterior layer is associated with a first composite region of the composite structure, wherein the second region of the exterior layer is associated with a second composite region of the composite structure, wherein the first composite region has a first thickness, and wherein the second composite region has a second thickness that is different than the first thickness.

9. The method according to claim 8, wherein the first composite region is thicker than the second composite region.

10. The method according to claim 9, wherein the first composite region is more rigid than the second composite region.

11. The method according to claim 7, wherein forming the first region of the exterior layer includes printing the heat deformable material onto the last member using an additive manufacturing process.

12. The method according to claim 11, wherein forming the second region of the exterior layer includes printing the heat deformable material onto the last member using the additive manufacturing process.

13. The method according to claim 7, wherein forming the braided footwear component onto the exterior layer includes inserting the last member with the exterior layer through a braiding device.

* * * * *